US012598667B2

(12) United States Patent
Yin et al.

(10) Patent No.: US 12,598,667 B2
(45) Date of Patent: Apr. 7, 2026

(54) COMMUNICATION METHOD AND COMMUNICATION APPARATUS

(71) Applicant: HUAWEI TECHNOLOGIES CO., LTD., Shenzhen (CN)

(72) Inventors: Yu Yin, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 18/176,211

(22) Filed: Feb. 28, 2023

(65) Prior Publication Data

US 2023/0217527 A1 Jul. 6, 2023

Related U.S. Application Data

(63) Continuation of application No. PCT/CN2021/093893, filed on May 14, 2021.

(30) Foreign Application Priority Data

Aug. 31, 2020 (CN) .......................... 202010895486.5

(51) Int. Cl.
*H04W 76/25* (2018.01)
*H04L 12/66* (2006.01)
(Continued)

(52) U.S. Cl.
CPC ............ *H04W 76/25* (2018.02); *H04W 76/11* (2018.02); *H04W 76/30* (2018.02)

(58) Field of Classification Search
CPC ....... H04L 69/164; H04L 67/14; H04L 67/10; H04L 45/24; H04L 12/189; H04L 45/566;
(Continued)

(56) References Cited

U.S. PATENT DOCUMENTS

2020/0107213 A1* 4/2020 Park ...................... H04M 15/66
2021/0076164 A1* 3/2021 Navratil .................. H04W 4/06
(Continued)

FOREIGN PATENT DOCUMENTS

WO 2020043319 A1 3/2020

OTHER PUBLICATIONS

"3rd Generation Partnership Project; Technical Specification Group Services and System Aspects; Study on Access Traffic Steering, Switch and Splitting support in the 5G system architecture Phase 2 (Release 17)," 3GPP TR 23.700-93 V0.2.0, pp. 1-42, 3rd Generation Partnership Project, Valbonne, France (Jul. 2020).
(Continued)

*Primary Examiner* — Kharye Pope
(74) *Attorney, Agent, or Firm* — Leydig, Voit & Mayer, Ltd.

(57) ABSTRACT

A communication method and a communication apparatus are provided, which relate to the field of communication technologies. The communication apparatus includes a communication protocol module and a QUIC module. The communication protocol module is configured to send a first request to establish a first PDU session for a first data network, receive a first response indicating that the first PDU session is successfully established, and after receiving the first response, send, to the QUIC module, a first notification including a first IP address. The QUIC module is configured to, after receiving the first notification, send, to an application server of the first data network, a second request to establish a first QUIC connection, and receive a second response that indicates that the first QUIC connection is successfully established. An IP address on a terminal device side of the first QUIC connection is the first IP address.

20 Claims, 10 Drawing Sheets

(51) Int. Cl.
   *H04W 76/11* (2018.01)
   *H04W 76/30* (2018.01)

(58) Field of Classification Search
   CPC ... H04L 47/122; H04L 47/193; H04L 67/141;
      H04W 76/12; H04W 76/10; H04W 12/06;
      H04W 76/15; H04W 8/08; H04W 48/18;
      H04W 80/06; H04W 28/0263; H04W
         12/033; H04W 12/08; H04W 88/06
   See application file for complete search history.

(56) References Cited

U.S. PATENT DOCUMENTS

| | | | | |
|---|---|---|---|---|
| 2021/0144592 A1* | 5/2021 | Vikberg | ............... | H04W 8/08 |
| 2022/0116327 A1* | 4/2022 | Salkintzis | ......... | H04W 28/0215 |
| 2022/0286904 A1* | 9/2022 | Ihlar | ............... | H04W 28/0268 |
| 2022/0386166 A1* | 12/2022 | Sarker | ............... | H04L 69/164 |

OTHER PUBLICATIONS

Huawei et al., "KI #2, Sol #8: Update QUIC solution to solve ENs," 3GPP TSG-WG SA2 Meeting #139E e-meeting, S2-2005473, Elbonia, Total 7 pages, 3rd Generation Partnership Project, Valbonne, France (Aug. 19-Sep. 1, 2020).

Lenovo et al., "Update of Solution #1: QUIC-LL steering functionality," SA WG2 Meeting #140E (e-meeting), S2-2004938, Elbonia, Total 23 pages, 3rd Generation Partnership Project, Valbonne, France (Aug. 19-Sep. 1, 2020).

Lenovo et al., "Update of Solution #6: MPQUIC-LL steering functionality," SA WG2 Meeting #140E (e-meeting, S2-2004939, Elbonia, Total 20 pages, 3rd Generation Partnership Project, Valbonne, France (Aug. 19-Sep. 1, 2020).

* cited by examiner

A terminal device sends a first request to a mobility management network element, where the first request requests to establish a first PDU session for a first data network — 801

The terminal device receives a first response from a first session management network element, where the first response indicates that the first PDU session is successfully established, and the first response includes a first IP address of the terminal device — 802

The terminal device sends a second request to an application server of the first data network, where the second request requests to establish a first QUIC connection, the second request includes a first connection identifier, the first connection identifier identifies the first QUIC connection, and an IP address on a terminal device side of the first QUIC connection is the first IP address — 803

The terminal device receives a second response sent by the application server, where the second response indicates that the first QUIC connection is successfully established, and the second response includes the first connection identifier — 804

FIG. 8

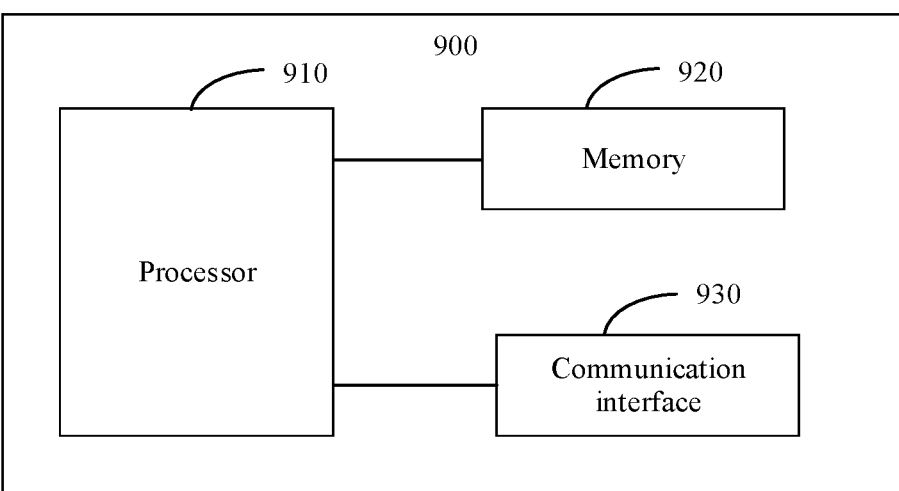

FIG. 9

COMMUNICATION METHOD AND COMMUNICATION APPARATUS

CROSS-REFERENCE TO RELATED APPLICATIONS

This application is a continuation of International Application No. PCT/CN2021/093893, filed on May 14, 2021, which claims priority to Chinese Patent Application No. 202010895486.5, filed on Aug. 31, 2020. The disclosures of the aforementioned applications are hereby incorporated by reference in their entireties.

TECHNICAL FIELD

The present disclosure relates to the field of communication technologies, and in particular, to a communication method and a communication apparatus.

BACKGROUND

In a 5th generation (5G) mobile communication technology, a terminal device communicates with a data network through a protocol data unit (PDU) session, and the PDU session is a connection between the terminal device and the data network. Specifically, a session management function (SMF) is a control plane anchor of the PDU session. When the terminal device moves out of a service area of the SMF, the terminal device needs to reestablish a PDU session with a data network having a same data network name (DNN), so that the terminal device can still continue to communicate with the data network.

However, in the current technologies, if the terminal device reestablishes a PDU session, an internet protocol (IP) address on a terminal device side changes, and a transmission control protocol (TCP) connection between the terminal device and the data network needs to be reestablished. Consequently, the TCP connection is disconnected due to the PDU session reestablishment, causing service interruption and affecting user experience.

SUMMARY

The present disclosure provides a communication method and a communication apparatus, so that when an IP address on a terminal device side changes due to PDU session reestablishment, a connection between the communication apparatus and an application server does not need to be disconnected. This helps maintain service continuity and improve user experience.

According to a first aspect, the present disclosure provides a communication apparatus, including a communication protocol module and a QUIC module. QUIC, which is not an acronym, is a general purpose transport layer network protocol. The communication protocol module is configured to send a first request to a mobility management network element, where the first request requests to establish a first protocol data unit PDU session for a first data network. The communication protocol module is further configured to receive a first response from a first session management network element, and send a first notification to the QUIC module after receiving the first response, where the first response indicates that the first PDU session is successfully established, the first response includes a first IP address of the terminal device, and the first notification includes the first IP address. The QUIC module is configured to: receive the first notification from the communication protocol module, and send a second request to an application server of the first data network after receiving the first notification, where the second request requests to establish a first QUIC connection, the second request includes a first connection identifier, the first connection identifier identifies the first QUIC connection, the first connection identifier is allocated by the QUIC module to the first QUIC connection, and an IP address on a terminal device side of the first QUIC connection is the first IP address. The QUIC module is further configured to receive a second response from the application server, where the second response indicates that the first QUIC connection is successfully established, and the second response includes the first connection identifier.

In this embodiment, because the QUIC module is added, the communication apparatus can establish a QUIC connection instead of a TCP connection between the communication apparatus and the application server after the PDU session is successfully established. Therefore, when an IP address on a terminal device side changes due to PDU session reestablishment, a connection between the communication apparatus and the application server does not need to be disconnected. This helps maintain service continuity and improve user experience.

In a possible design, the communication protocol module is further configured to send a third request to the mobility management network element, and the third request requests to establish a second PDU session for the first data network.

The communication protocol module is further configured to: receive a third response from a second session management network element, and send a second notification to the QUIC module after receiving the third response, where the third response indicates that the second PDU session is successfully established, the third response includes a second IP address of the terminal device, and the second notification includes the first IP address and the second IP address.

The QUIC module is configured to: receive the second notification from the communication protocol module, determine the first connection identifier based on the first IP address after receiving the second notification, and change the IP address on the terminal device side of the first QUIC connection identified by the first connection identifier to the second IP address.

According to the foregoing technical solution, when the IP address on the terminal device side changes due to PDU session reestablishment, the connection between the communication apparatus and the application server does not need to be disconnected. This helps maintain service continuity, improve user experience, and further helps reduce complexity of implementing the solution.

In a possible design, the first notification further includes a first session identifier, the first session identifier identifies the first PDU session, and the first session identifier is allocated by the communication protocol module to the first PDU session. The QUIC module is further configured to associate the first session identifier with the first connection identifier after receiving the second response. In this way, the communication protocol module does not need to obtain the first connection identifier. This helps improve security of the first connection identifier.

In a possible design, the communication protocol module is further configured to send a third request to the mobility management network element, and the third request requests to establish a second PDU session for the first data network.

The communication protocol module is further configured to: receive a third response from a second session management network element, and send a second notification to the QUIC module after receiving the third response, where the third response indicates that the second PDU session is successfully established, the third response includes a second IP address of the terminal device, the second notification includes the first session identifier, the second IP address, and a second session identifier, the second session identifier identifies the second PDU session, and the second session identifier is allocated by the communication protocol module to the second PDU session.

The QUIC module is configured to: receive the second notification from the communication protocol module, determine the first connection identifier based on the first session identifier after receiving the second notification, change the IP address on the terminal device side of the first QUIC connection identified by the first connection identifier to the second IP address, and change the first session identifier associated with the first connection identifier to the second session identifier.

According to the foregoing technical solution, when the IP address on the terminal device side changes due to PDU session reestablishment, the connection between the communication apparatus and the application server does not need to be disconnected. This helps maintain service continuity.

In a possible design, the QUIC module is further configured to send a third notification to the communication protocol module after changing the IP address on the terminal device side of the first QUIC connection to the second IP address, where the third notification indicates that the QUIC connection is successfully migrated.

The communication protocol module is further configured to delete the first PDU session after receiving the third notification.

The foregoing technical solution helps avoid a waste of resources.

In a possible design, the QUIC module is further configured to send a fourth notification to the communication protocol module, where the fourth notification includes a first mapping identifier, the first mapping identifier identifies the first QUIC connection, and the first mapping identifier is allocated by the QUIC module.

The communication protocol module is further configured to: receive the fourth notification from the QUIC module, and associate the first mapping identifier with the first IP address or a first session identifier after receiving the fourth notification, where the first session identifier identifies the first PDU session, and the first session identifier is allocated by the communication protocol module to the first PDU session.

In a possible design, the communication protocol module is further configured to send a third request to the mobility management network element, and the third request requests to establish a second PDU session for the first data network.

The communication protocol module is further configured to: receive a third response from a second session management network element, determine the first mapping identifier based on the first IP address or the first session identifier after receiving the third response, and send a second notification to the QUIC module, where the third response indicates that the second PDU session is successfully established, the third response includes an second IP address of the terminal device, and the second notification includes the first mapping identifier and the second IP address.

The QUIC module is further configured to: receive the second notification from the communication protocol module, change the IP address on the terminal device side of the first QUIC connection identified by the first mapping identifier to the second IP address after receiving the second notification, and send a third notification to the communication protocol module, where the third notification indicates that the QUIC connection is successfully migrated.

The communication protocol module is further configured to: after receiving the third notification, change the first IP address associated with the first mapping identifier to the second IP address; or the communication protocol module is further configured to: after receiving the third notification, change the first session identifier associated with the first mapping identifier to a second session identifier, where the second session identifier identifies the second PDU session, and the second session identifier is allocated by the communication protocol module to the second PDU session.

According to the foregoing technical solution, when the IP address on the terminal device side changes due to PDU session reestablishment, the connection between the communication apparatus and the application server does not need to be disconnected. This helps maintain service continuity and improve reliability of an association relationship between a mapping identifier and a session identifier.

In a possible design, the communication protocol module is further configured to delete the first PDU session after receiving the third notification. This helps avoid a waste of resources.

In a possible design, the first mapping identifier is associated with the first connection identifier.

According to a second aspect, the present disclosure provides a communication method. The communication method includes:

A terminal device sends a first request to a mobility management network element, where the first request requests to establish a first protocol data unit PDU session for a first data network. Then, the terminal device receives a first response from a first session management network element, where the first response indicates that the first PDU session is successfully established, and the first response includes a first IP address of the terminal device. The terminal device sends a second request to an application server of the first data network, where the second request requests to establish a first QUIC connection, the second request includes a first connection identifier, the first connection identifier identifies the first QUIC connection, and an IP address on a terminal device side of the first QUIC connection is the first IP address. The terminal device receives a second response sent by the application server, where the second response indicates that the first QUIC connection is successfully established, and the second response includes the first connection identifier.

In a possible design, the terminal device sends a third request to the mobility management network element, and the third request requests to establish a second PDU session for the first data network.

The terminal device receives a third response from a second session management network element, where the third response indicates that the second PDU session is successfully established, and the third response includes a second IP address of the terminal device.

The terminal device changes the IP address on the terminal device side of the first QUIC connection to the second IP address.

In a possible design, a first session identifier is associated with the first connection identifier, and the first session identifier identifies the first PDU session. After determining the first connection identifier based on the first session identifier, the terminal device changes the IP address on the terminal device side of the first QUIC connection to the second IP address, and then changes the first session identifier associated with the first connection identifier to a second session identifier, where the second session identifier identifies the second PDU session.

In a possible design, the first IP address or the first session identifier is associated with a first mapping identifier, the first session identifier identifies the first PDU session, and the first mapping identifier identifies the first QUIC connection.

In a possible design, the terminal device sends a third request to the mobility management network element, and the third request requests to establish a second PDU session for the first data network.

The terminal device receives a third response from a second session management network element, where the third response indicates that the second PDU session is successfully established, and the third response includes a second IP address of the terminal device.

The terminal device determines the first mapping identifier based on the first IP address or the first session identifier, and changes the first IP address associated with the first mapping identifier to the second IP address or changes the first session identifier associated with the first mapping identifier to a second session identifier, where the second session identifier identifies the second PDU session.

In a possible design, the terminal device deletes the first PDU session after changing the IP address on the terminal device side of the first QUIC connection identified by the first connection identifier to the second IP address.

According to a third aspect, the present disclosure provides a communication apparatus. The communication apparatus includes a processor, configured to implement the method according to any one of the second aspect or the possible designs of the second aspect. The communication apparatus may further include a memory, configured to store a computer program and data. The memory is coupled to the processor, and when executing a computer program stored in the memory, the processor may implement the method according to any one of the second aspect and the possible designs of the second aspect. The apparatus may further include a communication interface. The communication interface is used by the apparatus to communicate with another device. For example, the communication interface may be a transceiver, a circuit, a bus, a module, or another type of communication interface. The another device may be a network device, a terminal device, or the like.

According to a fourth aspect, the present disclosure provides a computer-readable storage medium, including a computer program. When the computer program is run on a computer, the computer is enabled to perform the method according to any one of the second aspect or the possible designs of the second aspect.

According to a fifth aspect, the present disclosure provides a chip system. The chip system includes a processor, and may further include a memory. The chip system is configured to implement the method according to any one of the second aspect or the possible designs of the second aspect. The chip system may include a chip, or may include a chip and another discrete component.

According to a sixth aspect, the present disclosure provides a computer program product, including a computer program. When the computer program is run on a computer, the computer is enabled to perform the method according to any one of the second aspect or the possible designs of the second aspect.

In addition, for technical effects brought by any possible design in the second aspect to the sixth aspect, refer to technical effects brought by different designs in the communication apparatus part. Details are not described herein again.

BRIEF DESCRIPTION OF DRAWINGS

FIG. 8 is a schematic flowchart of another communication method according to an embodiment; and FIG. 9 is a schematic structural diagram of another communication apparatus according to an embodiment.

DESCRIPTION OF EMBODIMENTS

Figures 1, 2:
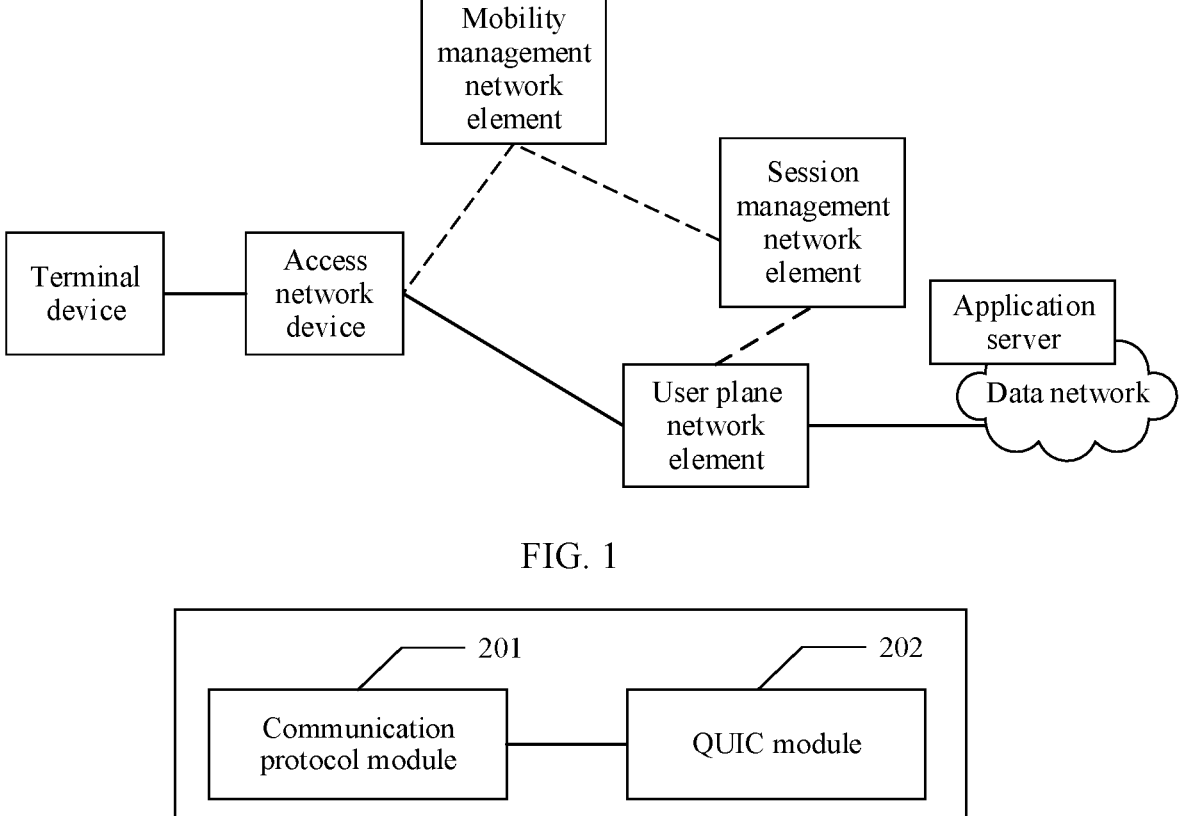
FIG. 1 is a schematic diagram of a network architecture.
FIG. 2 is a schematic structural diagram of a communication apparatus according to an embodiment.

For the problem proposed in the background, this present disclosure provides a communication apparatus and a communication method, so that the communication apparatus can establish a QUIC connection instead of a TCP connection between the communication apparatus and an application server after a PDU session is successfully established. Therefore, when an IP address on a terminal device side changes due to PDU session reestablishment, the connection between the communication apparatus and the application server does not need to be disconnected. This helps maintain service continuity and improve user experience.

It should be understood that, in embodiments, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" generally represents an "or" relationship between the associated objects. "At least one of the following pieces (items)" or a similar expression thereof indicates any combination of these items, including a single item (piece) or any combination of a plurality of items (pieces). For example, at least one (piece) of a, b, or c may represent a, b, c, a and b, a and c, b and c, or a, b, and c, where each of a, b, and c may be an element, or may be a set including one or more elements.

In embodiments, "example", "in some embodiments", "in another embodiment", and the like are used to represent giving an example, an illustration, or a description. Any embodiment or design scheme described as an "example" herein should not be explained as being more preferred or having more advantages than another embodiment or design scheme. The term "example" is used to present a concept in a specific manner.

In embodiments, "of (of)", "corresponding (corresponding, relevant)", and "corresponding (corresponding)" may be used interchangeably sometimes. It should be noted that meanings expressed by the terms are consistent when differences of the terms are not emphasized. In embodiments, communication and transmission may be used interchangeably sometimes. It should be noted that meanings expressed by the terms are consistent when differences are not emphasized. For example, transmitting may include sending and/or receiving, and may be in a noun form or a verb form.

It should be noted that, in embodiments, terms such as "first" and "second" are only used for a purpose of distinction in description, and should not be understood as an indication or implication of relative importance or an indication or implication of a sequence. In embodiments, "equal to" may be used together with "greater than", and this is applicable to a technical solution used when "greater than" is used; or "equal to" may be used together with "less than", and this is applicable to a technical solution used when "less than" is used. It should be noted that, when "equal to" is used together with "greater than", "equal to" is not used together with "less than", or when "equal to" is used together with "less than", "equal to" is not used together with "greater than".

A "network element" may also be referred to as a "device". This is not limited. The network element may be hardware, or may be software obtained through functional division, or a structure of a combination thereof. The network element may include a core network element, an access network element (for example, an access network device), or the like. The core network element includes, for example, a session management network element or a user plane network element.

FIG. 1 is a schematic diagram of a network architecture to which embodiments of this disclosure are applicable. As shown in the figure, the network architecture includes an access network device, a mobility management network element, a session management network element, a user plane network element, and an application server in a data network (DN). The access network device is an access network element, and the mobility management network element, the session management network element, and the user plane network element are core network elements.

The mobility management network element is responsible for mobility management of the terminal device. For example, the mobility management network element is a mobility management entity (MME) or an access and mobility management function (AMF) entity.

The session management network element is configured to control establishment, modification, and deletion of a PDU session, and is for example, a session management function (SMF) entity.

The user plane network element is responsible for connecting to an external network (for example, a data network), for example, a user plane function (UPF) entity.

Performing the communication method relates to a terminal device. It should be understood that in embodiments, a terminal may also be referred to as a terminal device, user equipment, a mobile terminal, or the like.

For example, the network architecture shown in FIG. 1 may be a 5th generation mobile communication technology (5G) network architecture. In this case, the access network device may be a radio access network (RAN) node, the mobility management network element may be an AMF entity, the session management network element may be an SMF entity, and the user plane network element may be a UPF entity.

A main function of the RAN node (which may also be referred to as an access network (AN) node) is to control the terminal device to access a mobile communication network in a wireless manner. The RAN node may also be referred to as a RAN device, a RAN network element, an access network device, or an access node, and includes but is not limited to: a gNodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission point (TRP), a transmission point (TP), a mobile switching center, and the like. In addition, the RAN node may further include a wireless fidelity (Wi-Fi) access point (AP), and the like.

In addition, for brevity of description, in subsequent descriptions, "entity" in each function entity is removed. For example, the AMF entity is referred to as an AMF for short, and the UPF entity is referred to as a UPF for short. Other entities are similar, which are not enumerated one by one.

In the 5G network architecture, any two network elements of the AMF, the SMF, the UPF, and the like may communicate with each other in a service-based communication manner. In addition, the AMF may communicate with the terminal device through an N1 interface, the AMF may communicate with the RAN node through an N2 interface, the RAN node may communicate with the UPF through an N3 interface, the SMF may communicate with the UPF through an N4 interface, the terminal device communicates with the RAN node through an air interface, and UPFs communicate with each other through an N9 interface. It should be noted that the service-oriented interfaces between the network elements may alternatively be replaced with point-to-point interfaces.

In the network architecture shown in FIG. 1, network elements are mainly the access network device, the mobility management network element, the session management network element, the user plane network element, and the application server in the DN.

It should be noted that FIG. 1 is merely an example of a network architecture to which embodiments are applicable, and does not constitute any limitation on embodiments of this disclosure. Embodiments may be alternatively applied to another network architecture, for example, a future mobile communication network architecture (for example, a 6G network architecture).

It should be understood that the terminal device is a device or an apparatus having a wireless transceiver function, and may also be referred to as user equipment (UE), a mobile terminal, a mobile apparatus, a wireless terminal device, or the like. The terminal device may be deployed on land, including an indoor or outdoor device, a handheld device, or a vehicle-mounted device, or may be deployed on water (for example, on a ship), or may be deployed in the air (for example, on an airplane, a balloon, or a satellite). For example, the terminal device may be a mobile phone, a tablet computer (pad), a smart screen, a computer having a wireless transceiver function, a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, or a wireless terminal in a smart home.

For example, a structure of the terminal device may be as shown in FIG. 2. The terminal device includes a communication protocol module 201 and a QUIC module 202. The communication protocol module 201 is configured to send a first request to a mobility management network element, where the first request requests to establish a first PDU session for a first data network.

The communication protocol module 202 is further configured to: receive a first response from a first session management network element, and send a first notification to the QUIC module 202 after receiving the first response, where the first response indicates that the first PDU session is successfully established, the first response includes a first IP address of the terminal device, and the first notification includes the first IP address.

The QUIC module 202 is configured to: receive the first notification from the communication protocol module 201, and send a second request to an application server of the first data network after receiving the first notification, where the second request requests to establish a first QUIC connection, the second request includes a first connection identifier, the first connection identifier identifies the first QUIC connection, the first connection identifier is allocated by the QUIC module 202 to the first QUIC connection, and an IP address on a terminal device side of the first QUIC connection is the first IP address.

The QUIC module 202 is further configured to receive a second response from the application server, where the second response indicates that the first QUIC connection is successfully established, and the second response includes the first connection identifier.

In some embodiments, the communication protocol module 201 is further configured to send a third request to the mobility management network element, and the third request requests to establish a second PDU session for the first data network.

The communication protocol module 201 is further configured to: receive a third response from a second session management network element, and send a second notification to the QUIC module 202 after receiving the third response, where the third response indicates that the second PDU session is successfully established, the third response includes a second IP address of the terminal device, and the second notification includes the first IP address and the second IP address.

The QUIC module 202 is configured to: receive the second notification from the communication protocol module 201, determine the first connection identifier based on the first IP address after receiving the second notification, and change the IP address on the terminal device side of the first QUIC connection identified by the first connection identifier to the second IP address.

Further, in some embodiments, the first notification further includes a first session identifier, the first session identifier identifies the first PDU session, and the first session identifier is allocated by the communication protocol module 201 to the first PDU session.

The QUIC module 202 is further configured to associate the first session identifier with the first connection identifier after receiving the second response.

Alternatively, in some embodiments, the communication protocol module 201 is further configured to send a third request to the mobility management network element, and the third request requests to establish a second PDU session for the first data network.

The communication protocol module 201 is further configured to: receive a third response from a second session management network element, and send a second notification to the QUIC module 202 after receiving the third response, where the third response indicates that the second PDU session is successfully established, the third response includes a second IP address of the terminal device, the second notification includes the first session identifier, the second IP address, and a second session identifier, the second session identifier identifies the second PDU session, and the second session identifier is allocated by the communication protocol module 201 to the second PDU session.

The QUIC module 202 is configured to: receive the second notification from the communication protocol module 201, determine the first connection identifier based on the first session identifier after receiving the second notification, change the IP address on the terminal device side of the first QUIC connection identified by the first connection identifier to the second IP address, and change the first session identifier associated with the first connection identifier to the second session identifier.

In addition, in some other embodiments, the QUIC module 202 is further configured to send a third notification to the communication protocol module 201 after changing the IP address on the terminal device side of the first QUIC connection to the second IP address, where the third notification indicates that the QUIC connection is successfully migrated; and the communication protocol module 201 is further configured to delete the first PDU session after receiving the third notification.

Alternatively, in some embodiments, the QUIC module 202 is further configured to send a fourth notification to the communication protocol module 201, where the fourth notification includes a first mapping identifier, the first mapping identifier identifies the first QUIC connection, and the first mapping identifier is allocated by the QUIC module 202. For example, that the first mapping identifier identifies the first QUIC connection may be implemented by associating the first mapping identifier with the first connection identifier.

The communication protocol module 201 is further configured to: receive the fourth notification from the QUIC module 202, and associate the first mapping identifier with the first IP address or a first session identifier after receiving the fourth notification, where the first session identifier identifies the first PDU session, and the first session identifier is allocated by the communication protocol module 201 to the first PDU session.

Further, in some embodiments, the communication protocol module 201 is further configured to send a third request to the mobility management network element, and the third request requests to establish a second PDU session for the first data network.

The communication protocol module 202 is further configured to: receive a third response from a second session management network element, determine the first mapping identifier based on the first IP address or the first session identifier after receiving the third response, and send a second notification to the QUIC module 201, where the third response indicates that the second PDU session is successfully established, the third response includes an second IP address of the terminal device, and the second notification includes the first mapping identifier and the second IP address.

The QUIC module 202 is further configured to: receive the second notification from the communication protocol module 201, change the IP address on the terminal device side of the first QUIC connection identified by the first mapping identifier to the second IP address after receiving the second notification, and send a third notification to the communication protocol module 201, where the third notification indicates that the QUIC connection is successfully migrated.

The communication protocol module 201 is further configured to: after receiving the third notification, change the first IP address associated with the first mapping identifier to the second IP address; or the communication protocol module 201 is configured to: after receiving a QUIC connection migration success notification, change the first session identifier associated with the first mapping identifier to a second session identifier, where the second session identifier identifies the second PDU session, and the second session identifier is allocated by the communication protocol module 201 to the second PDU session.

In some embodiments, the communication protocol module 201 is further configured to delete the first PDU session after receiving the third notification.

It should be noted that the communication protocol module 201 and the QUIC module 202 may be deployed on a same chip (for example, a modem) of the terminal device, or may be deployed on different chips of the terminal device. This is not limited herein.

The following describes in detail the communication method according to certain embodiments of this disclosure by using a terminal device having a structure as shown in FIG. 2 and a 5G network architecture as an example.

Example 1

Figure 3A:
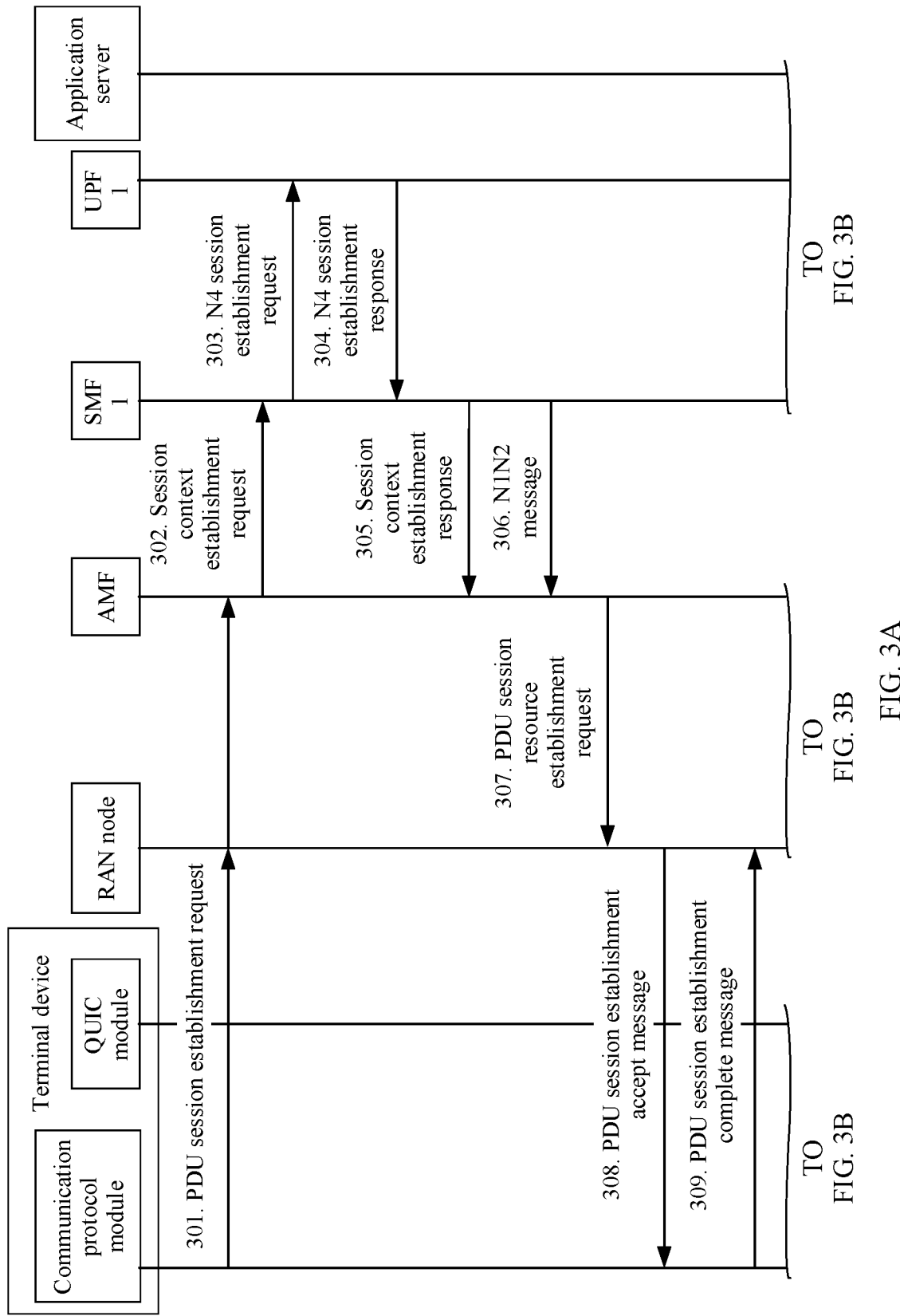
FIG. 3A and FIG. 3B are a schematic flowchart of a communication method according to an embodiment.
Figure 3B:
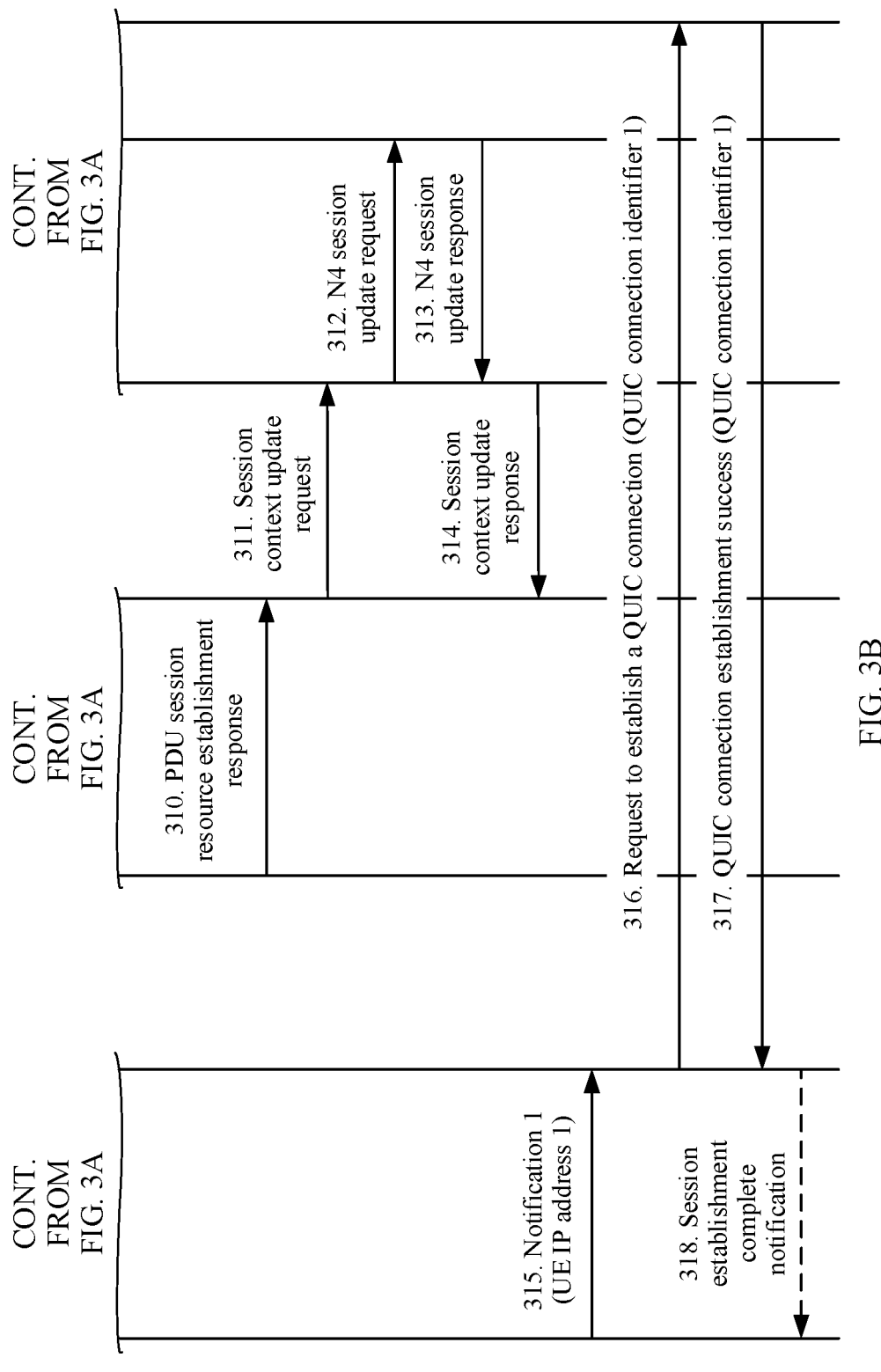

FIG. 3A and FIG. 3B are a schematic flowchart of a communication method. The communication method includes the following steps.

301. A communication protocol module in a terminal device sends a request 1 to an AMF, where the request 1 is used to establish a PDU session for a data network.

In some embodiments, the terminal device triggers a PDU session establishment procedure by using an event. For example, when the terminal device needs to perform a service, the terminal device triggers the PDU session establishment procedure. For example, if the terminal device needs to obtain data from an application server in the data network in response to an operation of opening a video by a user, the communication protocol module is triggered to send the request 1 to the AMF. For another example, if the terminal device needs to upload a document to an application server in the data network in response to an operation of uploading a document by a user, the communication protocol module is triggered to send the request 1 to the AMF.

The request 1 may also be referred to as a PDU session establishment request. For example, the request 1 includes information such as a PDU session identifier 1, a requested session and service continuity mode (SSC mode), a data network name (DNN), and/or a slice identifier. It should be noted that the PDU session identifier 1 is allocated by the terminal device to the PDU session that is requested to be established. For example, the PDU session identifier 1 is allocated by the communication protocol module to the PDU session that is requested to be established. In addition, when a PDU session of an SSC mode 3 type is requested to be established, the requested SSC mode is the SSC mode 3.

For example, the request 1 is sent by the communication protocol module to a RAN node, and then forwarded by the RAN node to the AMF.

302. After receiving the request 1 from the terminal device, the AMF sends a request 2 to the SMF 1, where the request 2 is used to initiate, for the terminal device, a session context establishment procedure for a PDU session to the SMF 1.

In some embodiments, after receiving the request 1 from the terminal device, the AMF selects an SMF for providing a service for the terminal device. When the selected SMF for providing a service for the terminal device is the SMF 1, the AMF sends the request 2 to the SMF 1. For example, the AMF may select, based on information such as a current location area identifier of the terminal device and a slice identifier in the request 1, the SMF for providing a service for the terminal device.

The request 2 may also be referred to as a request for establishing a session context, a session context establishment request, or the like. This is not limited herein. For example, the request 2 may include information such as a terminal device identifier, the PDU session identifier 1, the requested SSC mode, the DNN, and the slice identifier.

303. After receiving the request 2 from the AMF, the SMF 1 sends a request 3 to the UPF 1, where the request 3 is used to initiate, to a UPF 1 for a PDU session that the terminal device requests to establish, a procedure of establishing an N4 session between the SMF 1 and the UPF 1.

In some embodiments, after receiving the request 2 from the AMF, the SMF 1 selects a UPF for providing a service for the PDU session that the terminal device requests to establish. When the selected UPF is the UPF 1, the SMF 1 sends the request 3 to the UPF 1. For example, for a manner in which the SMF 1 selects the UPF for providing a service for the PDU session that the terminal device requests to establish, refer to existing related implementations. This is not limited in this embodiment.

The request 3 may also be referred to as an N4 session establishment request, a request for establishing an N4 session, or the like. This is not limited herein.

304. After receiving the request 3 sent by the SMF 1, the UPF 1 returns a response 3 to the SMF 1, where the response 3 is a response to the request 3. For example, the response 3 may also be referred to as an N4 session establishment response, a response for establishing an N4 session, or the like, and may include service data packet forwarding information allocated by the UPF 1 to the PDU session that the terminal device requests to establish, for example, a tunnel endpoint identifier and/or an IP address of the UPF 1.

305. After receiving the response 3 from the UPF 1, the SMF 1 sends a response 2 to the AMF, where the response 2 is a response to the request 2. For example, the response 2 may also be referred to as a response for establishing a session context, a session context establishment response, or the like.

306. The SMF 1 sends an N1N2 message to the AMF, where the N1N2 message includes the response 1 and a request 4. The response 1 is a response to the request 1, and is sent by the SMF 1 to the communication protocol module of the terminal device. The response 1 indicates that the PDU session is successfully established, that is, the response 1 indicates that a PDU session identified by the PDU session identifier 1 is successfully established. For example, the response 1 may also be referred to as a PDU session establishment accept message, and the response 1 may include an IP address of the terminal device that is allocated by the SMF 1 or the UPF 1 to the PDU session that is requested to be established. For ease of description, the IP address of the terminal device is briefly referred to as a UE IP address below. When the UE IP address allocated by the SMF 1 or the UPF 1 to the PDU session that is requested to be established is the UE IP address 1, the response 1 may include the UE IP address 1. In some embodiments, the response 1 may further include an SSC mode selected by the SMF 1. For example, the SMF 1 may select a corresponding SSC mode based on the SSC mode requested in the request 2. The request 4 requests the RAN node to establish a PDU session, and may also be referred to as a PDU session resource establishment message or a PDU session resource establishment request. For example, the request 4 may include information such as a tunnel endpoint identifier and/or an IP address of the UPF 1.

307. The AMF receives the N1N2 message from the SMF, and sends the request 4 and the response 1 to the RAN node.

308. After receiving the request 4 and the response 1, the RAN node forwards the response 1 to the terminal device.

309. The terminal device receives the response 1 by using the communication protocol module, and after receiving the response 1, the communication protocol module sends a PDU session establishment complete message to the RAN node.

310. The RAN node receives the PDU session establishment complete message, and forwards the PDU session establishment complete message to the AMF. In addition, the RAN node further sends a response 4 to the AMF. The response 4 is a response to the request 4, and may also be referred to as a PDU session resource establishment response message, a PDU session resource establishment response, or the like. For example, the response 4 may include service data packet forwarding information allocated by the RAN node to the PDU session that the terminal device requests to establish, for example, a tunnel endpoint identifier and/or an IP address of the RAN node.

311. The AMF receives the response 4 from the RAN node, and sends a request 5 to the SMF 1. The request 5 requests to update a session context, and may also be referred to as a request for updating a session context, a session context update request, or the like. The request 5 may include service data packet forwarding information allocated by the RAN node to the PDU session that the terminal device requests to establish, such as a tunnel endpoint identifier and/or an IP address of the RAN node.

312. After receiving the request 5 sent by the AMF, the SMF 1 sends a request 6 to the UPF 1. The request 6 requests to update an N4 session, and may also be referred to as an N4 session update request, a request for updating an N4 session, or the like. The request 6 may include service data packet forwarding information allocated by the RAN node to the PDU session that the terminal device requests to establish, such as a tunnel endpoint identifier and/or an IP address of the RAN node.

313. After receiving the request 6 sent by the SMF 1, the UPF 1 sends a response 6 to the SMF 1. The response 6 is a response to the request 6, and indicates that the N4 session is successfully updated. For example, the response 6 may also be referred to as an N4 session update response or a response for updating an N4 session. This is not limited herein.

314. After receiving the response 6 from the UPF 1, the SMF 1 sends a response 5 to the AMF. The response 5 is a response to the request 5, and indicates that the session context is successfully updated. For example, the response 5 may also be referred to as a session context update response message, a session context update response, or the like. This is not limited herein.

315. After receiving the response 1, the communication protocol module of the terminal device sends a notification 1 to the QUIC module, where the notification 1 includes a UE IP address allocated by the SMF 1 or the UPF 1 to the PDU session that is requested to be established. In the following example, the UE IP address allocated by the SMF 1 or the UPF 1 to the PDU session that is requested to be established is the UE IP address 1, that is, the notification 1 includes the UE IP address 1.

316. The QUIC module receives the notification 1, and sends a request 7 to the application server in the data network after receiving the notification 1. The request 7 requests to establish a QUIC connection, that is, the request 7 triggers the terminal device to initiate a QUIC connection establishment procedure to the application server. For example, the request 7 includes a QUIC connection identifier 1 that identifies a QUIC connection that is requested to be established. In some embodiments, the QUIC connection identifier is allocated by the QUIC module. An IP address on a terminal device side of the QUIC connection identified by the QUIC connection identifier 1 is the UE IP address 1.

317. After receiving the request 7, the application server sends a response 7 to the terminal device. The response 7 is a response to the request 7, indicates that the QUIC connection identified by the QUIC connection identifier 1 is successfully established, and may include the QUIC connection identifier 1.

For example, the application server sends the response 7 to the QUIC module of the terminal device, that is, the terminal device receives the response 7 by using the QUIC module.

It should be noted that in this embodiment, the request 7 may be a handshake request or a handshake message, and the response 7 may be a handshake response, so as to implement a QUIC connection between the application server and the terminal device.

Further, in some embodiments, the communication method shown in FIG. 3A and FIG. 3B may further include step 318.

318. After receiving the response 7, the QUIC module of the terminal device returns a QUIC connection establishment complete message to the application server. Alternatively, after receiving the response 7, the QUIC module of the terminal device sends a session establishment complete notification to the communication protocol module.

It should be noted that, in this embodiment, step 315 to step 318 are performed after step 308, and there is no necessary sequence between step 315 to step 318 and step 309, step 310, step 311, step 312, step 313, and step 314.

In this embodiment, because the QUIC module is added to the terminal device, the terminal device can establish a QUIC connection after the PDU session is successfully established. Therefore, this helps avoid disconnection between the terminal device and the application server when a UE IP address changes due to PDU session reestablishment, and helps maintain service continuity and improve user experience.

In some embodiments, the communication protocol module may alternatively include the PDU session identifier 1 in the notification 1 and send the notification 1 to the QUIC module. Then, the QUIC module may further associate the QUIC connection identifier 1 with the PDU session identifier 1 after receiving the notification 1. For example, an association relationship between the QUIC connection identifier 1 and the PDU session identifier 1 may be stored in the terminal device, and may be read by the QUIC module. For example, the association relationship between the QUIC connection identifier 1 and the PDU session identifier 1 may not be read by the communication protocol module. For example, the association relationship between the QUIC connection identifier 1 and the PDU session identifier 1 may be stored in the terminal device in a format of a list, for example, as shown in Table 1.

TABLE 1

| QUIC connection identifier | PDU session identifier |
|---|---|
| QUIC connection identifier 1 | PDU session identifier 1 |

It should be noted that the association relationship between the QUIC connection identifier 1 and the PDU session identifier 1 may be alternatively stored in another format. This is not limited herein.

Alternatively, in some embodiments, the QUIC module allocates a mapping identifier 1 to the QUIC connection identified by the QUIC connection identifier 1. The mapping identifier 1 identifies the QUIC connection identified by the QUIC connection identifier 1. For example, an association relationship between the mapping identifier 1 and the QUIC connection identifier 1 or the UE IP address 1 may be established, so that the QUIC connection identified by the QUIC connection identifier 1 is identified. For example, the association relationship between the QUIC connection identifier 1 and the mapping identifier 1 may be correspondingly stored in the terminal device in a form of a list. For example, the QUIC connection identifier 1 is different from the mapping identifier 1, and the association relationship between the QUIC connection identifier 1 and the mapping identifier 1 may be read by the QUIC module, but reading by the communication protocol module is limited. This helps improve security of the QUIC connection identifier 1. For example, a storage format of the association relationship between the QUIC connection identifier 1 and the mapping identifier 1 may be as shown in Table 2.

TABLE 2

| QUIC connection identifier | Mapping identifier |
|---|---|
| QUIC connection identifier 1 | Mapping identifier 1 |

In this case, the QUIC module further sends a notification 2 to the communication protocol module. The notification 2 includes the mapping identifier 1. After receiving the mapping identifier 1, the communication protocol module associates the mapping identifier 1 with the PDU session identifier 1 or the UE IP address 1. The association relationship between the mapping identifier 1 and the PDU session identifier 1 or the UE IP address 1 may be correspondingly stored in the terminal device in a form of a list, and the association relationship may be read by the communication protocol module. A storage format of the association relationship between the mapping identifier 1 and the PDU session identifier 1 may be as shown in Table 3.

TABLE 3

| PDU session identifier | Mapping identifier |
|---|---|
| PDU session identifier 1 | Mapping identifier 1 |

It should be noted that the association relationship between the mapping identifier 1 and the PDU session identifier 1 or the UE IP address 1 or the association relationship between the mapping identifier 1 and the QUIC connection identifier 1 may be stored in another format in addition to a list. This is not limited in this embodiment.

In addition, it should be understood that associating the mapping identifier 1 with the UE IP address 1 may be performed by the QUIC module, or may be performed by the communication protocol module, and the association relationship between the mapping identifier 1 and the UE IP address 1 may be read by the communication protocol module, or may be read by the QUIC module. Certainly, when the QUIC module associates the mapping identifier 1 with the QUIC connection identifier 1, and the communication protocol module associates the mapping identifier 1 with the PDU session identifier 1 or the UE IP address 1, the association relationship between the mapping identifier 1 and the QUIC connection identifier 1 may be read by the QUIC module, but cannot be read by the communication protocol module, and the association relationship between the mapping identifier 1 and the PDU session identifier 1 or the UE IP address 1 can be read by the communication protocol module. Certainly, the association relationship between the mapping identifier 1 and the PDU session identifier 1 or the UE IP address 1 may be read by the QUIC module, or may not be read by the QUIC module. This is not limited.

Figure 4A:
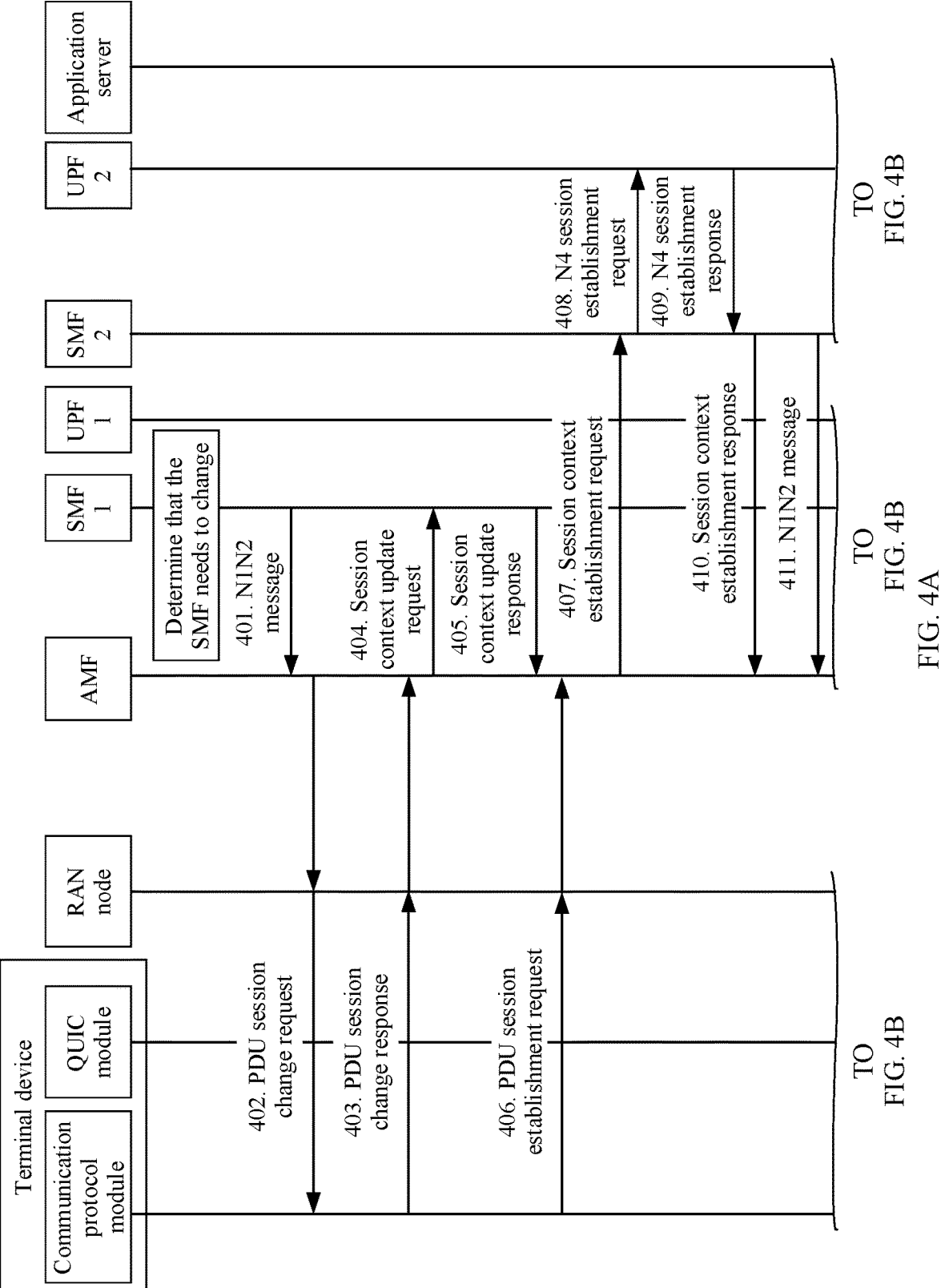
FIG. 4A and FIG. 4B are a schematic flowchart of another communication method according to an embodiment.
Figure 4B:
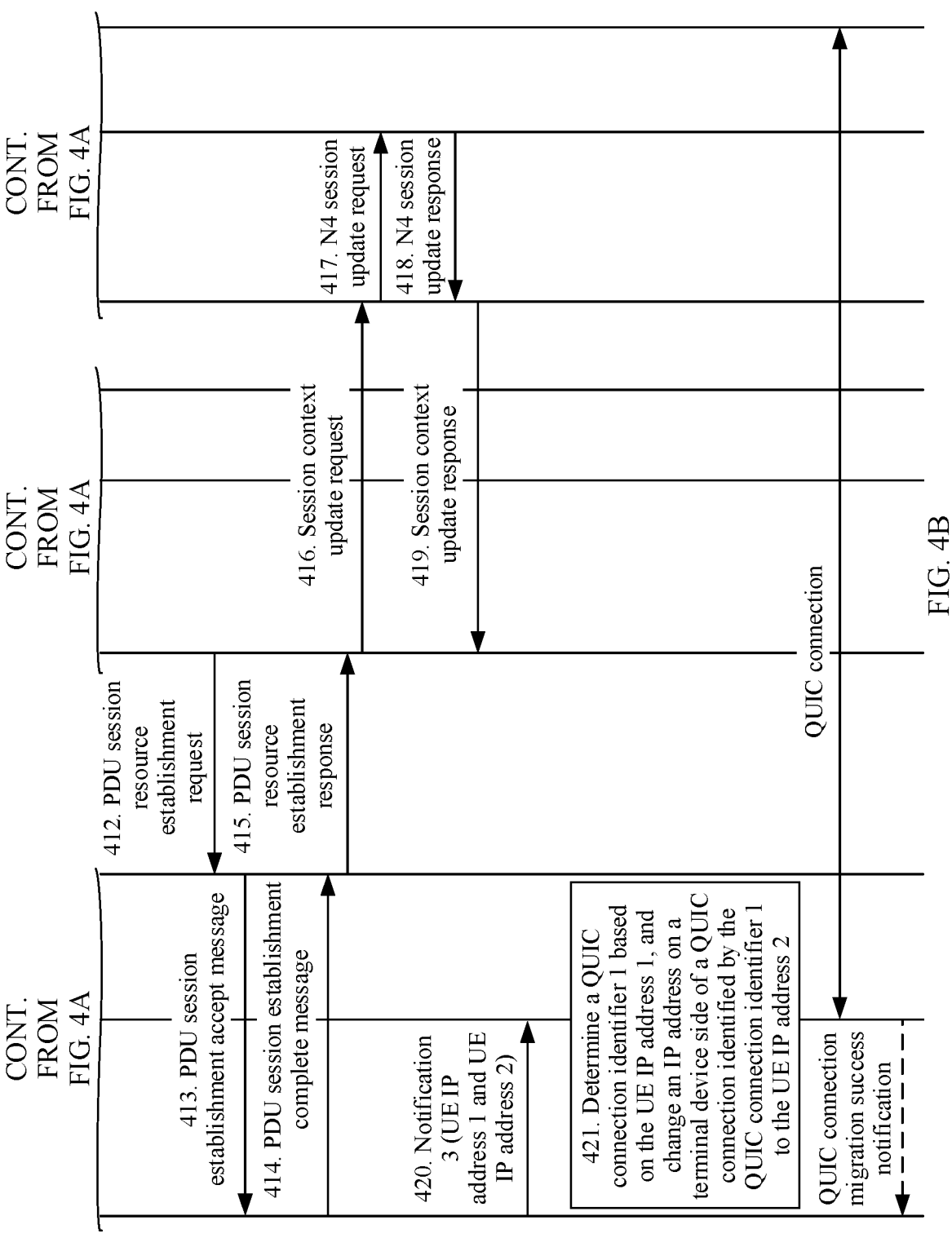

Example 2: Based on Example 1, when detecting that the SMF 1 is not an optimal SMF for providing a service for the terminal device, the SMF 1 triggers a PDU session migration procedure. For example, when detecting that the terminal device moves out of a service area of the SMF 1, the SMF 1 triggers the PDU session migration procedure. For example, when the terminal device includes a QUIC module, the PDU session migration procedure may be as shown in FIG. 4A and FIG. 4B, and includes the following steps.

401. The SMF 1 detects an event that triggers a PDU session migration procedure, and sends an N1N2 message to an AMF. The N1N2 message may include information such as a PDU session identifier 1, an SMF change indication, and a request 8. The request 8 requests a terminal device to update a PDU session, and may also be referred to as a PDU session update request or the like.

402. After receiving the N1N2 message, the AMF sends the request 8 to a communication protocol module of the terminal device.

For example, the AMF may send the request 8 to the communication protocol module of the terminal device by using a RAN node. In this case, the RAN node is configured to forward the request 8.

403. After receiving the request 8, the communication protocol module of the terminal device sends a response 8 to the AMF. The response 8 is a response to the request 8, and may also be referred to as a PDU session change response.

For example, the communication protocol module of the terminal device sends the response 8 to the AMF by using the RAN node. In this case, the RAN node is configured to forward the response 8.

404. The AMF receives the response 8, and sends a request 9 to the SMF 1. The request 9 is used to forward the response 8, and may also be referred to as a session context update request message, a request for updating a session context, a session context update request, or the like.

405. The SMF 1 receives the request 9, and sends a response 9 to the AMF. The response 9 is a response to the request 9, and may also be referred to as a session context update response message, a response for updating a session context, a session context update response, or the like.

406. After receiving the request 8, the communication protocol module of the terminal device sends a request 10 to the AMF, where the request 10 requests to establish a new PDU session for a same data network. For example, in step 301 shown in FIG. 3A, the request 1 requests to establish a PDU session for the first data network, and the request 10 requests to establish a new PDU session for the first data network.

The request 10 may also be referred to as a PDU session establishment request, a request for establishing a PDU session, or the like. For example, the request 10 may include one or more of information such as a PDU session identifier 2, a PDU session identifier 1, a requested SSC mode, a data network name, and/or a slice identifier. The PDU session identifier 2 is allocated by the communication protocol module of the terminal device, and identifies a new PDU session that is requested to be established. It should be noted that the PDU session identifier 1 identifies a PDU session established in the communication method shown in FIG. 3A and FIG. 3B.

After receiving the request 8, the communication protocol module of the terminal device determines to switch the SMF for providing a service for the terminal device, and triggers the PDU session establishment procedure, that is, triggers the communication protocol module to send the request 10 to the AMF.

In some embodiments, the communication protocol module of the terminal device sends the request 10 to the AMF by using the RAN node. The communication protocol module first sends the request 10 to the RAN node, and then the RAN node forwards the request 10 to the AMF.

407. After receiving the request 10, the AMF sends the request 11 to the SMF 2. The request 11 is used to initiate a session context establishment procedure to the SMF 2 for the terminal device.

In some embodiments, after receiving the request 10, the AMF selects an SMF for providing a service for the terminal device. When the selected SMF for providing a service for the terminal device is an SMF 2, the AMF sends the request 11 to the SMF 2. For example, the AMF selects, based on one or more of information such as an SMF change indication, a current location area identifier of the terminal device, a slice identifier, and/or a data network name, the SMF 2 different from the SMF 1 to provide a service for the terminal device.

The request 11 may also be referred to as a request for establishing a session context, a session context establishment request, or the like. This is not limited herein. For example, the request 11 may include one or more of information such as a terminal device identifier, the PDU session identifier 1, the PDU session identifier 2, the requested SSC mode, the data network name, and/or the slice identifier.

408. After receiving the request 11, the SMF 2 sends a request 12 to the UPF 2. The request 12 is used to initiate, to the UPF 2 for a new PDU session that the terminal device requests to establish, a procedure of establishing an N4 session between the SMF 2 and the UPF 2.

In some embodiments, after receiving the request 11 from the AMF, the SMF 2 selects a UPF for providing a service for a new PDU session that the terminal device requests to establish. When the selected UPF is the UPF 2, the SMF 2 sends the request 12 to the UPF 2. For example, for a manner in which the SMF 2 selects the UPF for providing a service for the terminal device that requests to establish a new PDU session, refer to existing related implementations. This is not limited in this embodiment.

The request 12 may also be referred to as an N4 session establishment request, a request for establishing an N4 session, or the like. This is not limited herein.

409. After receiving the request 12, the UPF 2 sends a response 12 to the SMF 2. The response 12 is a response to the request 12. For example, the response 12 may also be referred to as an N4 session establishment response, a response for establishing an N4 session, or the like. The response 12 may include service data packet forwarding information allocated by the UPF 2 to the PDU session that the terminal device requests to establish, for example, a tunnel endpoint identifier and/or an IP address of the UPF 2.

410. After receiving the response 12, the SMF 2 sends a response 11 to the AMF. The response 11 is a response to the request 11. For example, the response 11 may also be referred to as a response for establishing a session context, a session context establishment response, or the like.

411. The SMF 2 sends an N1N2 message to the AMF, where the N1N2 message includes a response 10 and a request 13. The response 10 is a response to the request 10, and is sent by the SMF 2 to the communication protocol module of the terminal device. The response 10 indicates that the PDU session is successfully established, that is, the response 10 indicates that a PDU session identified by the PDU session identifier 2 is successfully established. For example, the response 10 may also be referred to as a PDU session establishment accept message, and may include an IP address of the terminal device that is allocated by the SMF 2 or the UPF 2 to the PDU session that is requested to be established. For ease of description, the IP address of the terminal device is briefly referred to as a UE IP address below. When the UE IP address allocated by the SMF 2 or the UPF 2 to the new PDU session requested to be established is a UE IP address 2, the response 10 may include the UE IP address 2. In some embodiments, the response 10 may further include an SSC mode selected by the SMF 2. For example, the SMF 2 may select a corresponding SSC mode based on the SSC mode requested in the request 10. The request 13 requests a RAN node to establish a PDU session, and may also be referred to as a PDU session resource establishment message or a PDU session resource establishment request. For example, the request 13 may include information such as a tunnel endpoint identifier and/or an IP address of the UPF 1.

412. After receiving the N1N2 message, the AMF sends the response 10 and the request 13 to the RAN node.

413. After receiving the request 13 and the response 10, the RAN node forwards the response 10 to the terminal device.

414. The terminal device receives the response 10 by using the communication protocol module, and after receiving the response 10, the communication protocol module sends a PDU session establishment complete message to the RAN node.

415. After receiving the PDU session establishment complete message, the RAN node forwards the PDU session establishment complete message to the AMF. The RAN node further sends a response 13 to the AMF. The response 13 is a response to the request 13, and may also be referred to as a PDU session resource establishment response message, a PDU session resource establishment response, or the like. For example, the response 13 may include service data packet forwarding information allocated by the RAN node to the PDU session that the terminal device requests to establish, for example, a tunnel endpoint identifier and/or an IP address of the RAN node.

416. The AMF receives the response 13, and sends a request 14 to the SMF 2. The request 14 requests to update a session context, and may also be referred to as a request for updating a session context, a session context update request, or the like. The request 14 may include service data packet forwarding information allocated by the RAN node to the PDU session that the terminal device requests to establish, such as a tunnel endpoint identifier and/or an IP address of the RAN node.

417. After receiving the request 14, the SMF 2 sends a request 15 to the UPF 2. The request 15 requests to update an N4 session, and may also be referred to as an N4 session update request, a request for updating an N4 session, or the like. The request 15 may include service data packet forwarding information allocated by the RAN node to the PDU session that the terminal device requests to establish, such as a tunnel endpoint identifier and/or an IP address of the RAN node.

418. After receiving the request 15, the UPF 2 sends a response 15 to the SMF 2. The response 15 is a response to the request 15, and indicates that the N4 session is successfully updated. For example, the response 15 may also be referred to as an N4 session update response or a response for updating an N4 session. This is not limited herein.

419. After receiving the response 15, the SMF 1 sends a response 14 to the AMF. The response 14 is a response to the request 14, and indicates that the session context is successfully updated. For example, the response 14 may also be referred to as a session context update response message, a session context update response, or the like. This is not limited herein.

420. After receiving the response 10, the communication protocol module of the terminal device sends a notification 3 to the QUIC module, where the notification 3 includes the UE IP address 1 and the UE IP address 2.

421. After receiving the notification 3, the QUIC module of the terminal device determines the QUIC connection identifier 1 based on the UE IP address 1. The UE IP address 1 is an IP address on a terminal device side of a QUIC connection identified by the QUIC connection identifier 1. Subsequently, the QUIC module changes the IP address on the terminal device side of the QUIC connection identified by the QUIC connection identifier 1 to the UE IP address 2. In this way, the terminal device communicates with an application server by using the changed IP address on the terminal device side of the QUIC connection, and does not need to disconnect the QUIC connection nor reestablish a connection to the application server, thereby implementing PDU session migration.

It should be noted that steps 420 and 421 are performed after step 413, and there is no necessary sequence between steps 420 and 421 and steps 414, 415, 416, 417, 418, and 419.

In addition, in some other embodiments, when the QUIC connection identifier 1 is associated with the PDU session identifier 1, step 420 and step 421 may be replaced with step 420-A and step 421-A.

Step 420-A. After receiving the response 10, the communication protocol module of the terminal device sends a notification 4 to the QUIC module, where the notification 4 includes the PDU session identifier 1, the PDU session identifier 2, and the UE IP address 2.

Step 421-A. After receiving the notification 4, the QUIC module of the terminal device determines the QUIC connection identifier 1 based on the PDU session identifier 1. Subsequently, the QUIC module changes the IP address on the terminal device side of the QUIC connection identified by the QUIC connection identifier 1 to the UE IP address 2.

Further, in some embodiments, after changing the IP address on the terminal device side of the QUIC connection identified by the QUIC connection identifier 1 to the UE IP address 2, the QUIC module further sends a notification 5 to the communication protocol module, where the notification 5 indicates that the QUIC connection is successfully migrated. After receiving the notification 5, the communication protocol module releases the PDU session identified by the PDU session identifier 1.

Alternatively, when a mapping identifier 1 is associated with the PDU session identifier 1 or the UE IP address 1, step 420 and step 421 may be replaced with step 420-B and step 421-B. It should be noted that for the mapping identifier 1, refer to related descriptions in the communication method shown in FIG. 3A and FIG. 3B. Details are not described herein again.

420-B. After receiving the response 10, the communication protocol module of the terminal device determines the mapping identifier 1 based on the PDU session identifier 1, and then sends a notification 6 to the QUIC module. The notification 6 includes the mapping identifier 1 and the UE IP address 2. Then, after receiving the notification 6, the QUIC module changes the IP address on the terminal device side of the QUIC connection identified by the mapping identifier 1 to the UE IP address 2, and sends a notification 5 to the communication protocol module, where the notification 5 indicates that the QUIC connection is successfully migrated.

421-B. After receiving the notification 5, the communication protocol module changes the PDU session identifier 1 associated with the mapping identifier 1 to the PDU session identifier 2.

It should be understood that, for a step performed after the QUIC module of the terminal device receives the response 10 when the mapping identifier 1 is associated with the UE IP address 1, refer to the step performed after the QUIC module of the terminal device receives the response 10 when the mapping identifier 1 is associated with the PDU session identifier 1. A difference lies in that: Step 420-B of determining the mapping identifier 1 based on the PDU session identifier 1 is replaced with determining the mapping identifier 1 based on the UE IP address 1, and step 421-B of changing the PDU session identifier 1 associated with the mapping identifier 1 to the PDU session identifier 2 is replaced with changing the UE IP address 1 associated with the mapping identifier 1 to the UE IP address 2.

Further, in some embodiments, when the application server receives a service data packet sent by the terminal device on the QUIC connection whose IP address on the terminal device side is changed to the UE IP address 2, the application server learns that the IP address on the terminal device side of the QUIC connection is migrated to the UE IP address 2, and the application server starts path validity detection. For example, the application server may perform path validity detection in the following manner: The application server sends a path detection (PATH CHALLENGE) data packet to the QUIC module, where a destination IP address in the data packet is the UE IP address 2. After receiving the path detection data packet from the application server, the QUIC module of the terminal device returns a path detection response (PATH RESPONSE) to the application server. After receiving the path detection response returned by the QUIC module of the terminal device, the application server determines that the UE IP address 2 is valid. In this case, a subsequent service data packet is transmitted on a QUIC connection whose IP address is the UE IP address 2 on the terminal device side. It should be noted that, in this embodiment, the application server and the QUIC module of the terminal device may further allocate, in a path detection process or another data packet exchange process, a new QUIC connection identifier, for example, a QUIC connection identifier 2, to a QUIC connection whose IP address on the terminal device side is migrated to the UE IP address 2. In this case, the QUIC module needs to change the QUIC connection identifier 1 to the QUIC connection identifier 2.

Alternatively, in some embodiments, after determining that the UE IP address 2 is valid, the application server sends a notification 7 to the QUIC module of the terminal device. The notification 7 indicates that the UE IP address 2 is valid. After receiving the notification 7, the QUIC module of the terminal device sends a notification 5 to the communication protocol module.

In some other embodiments, after receiving the notification 5, the communication protocol module releases the PDU session identified by the PDU session identifier 1. Alternatively, after receiving the notification 5, the communication protocol module deletes the PDU session identified by the PDU session identifier 1. In other words, after receiving the notification 5, the communication protocol module initiates a procedure of releasing the PDU session identified by the PDU session identifier 1. For a specific PDU session release procedure, refer to related descriptions in Example 3. Details are not described herein again.

Example 3: After receiving the notification 5 indicating that the QUIC connection is successfully migrated, the communication protocol module of the terminal device may initiate the procedure of releasing the PDU session identified by the PDU session identifier 1. Alternatively, after receiving the request 8, the communication protocol module starts a timer, and when the timer expires, initiates the procedure of releasing the PDU session identified by the PDU session identifier 1. Certainly, the foregoing merely describes an example of triggering the communication protocol module to initiate the PDU session release procedure. In this embodiment, the PDU session release procedure may be triggered in another manner. This is not limited herein.

Figure 5:
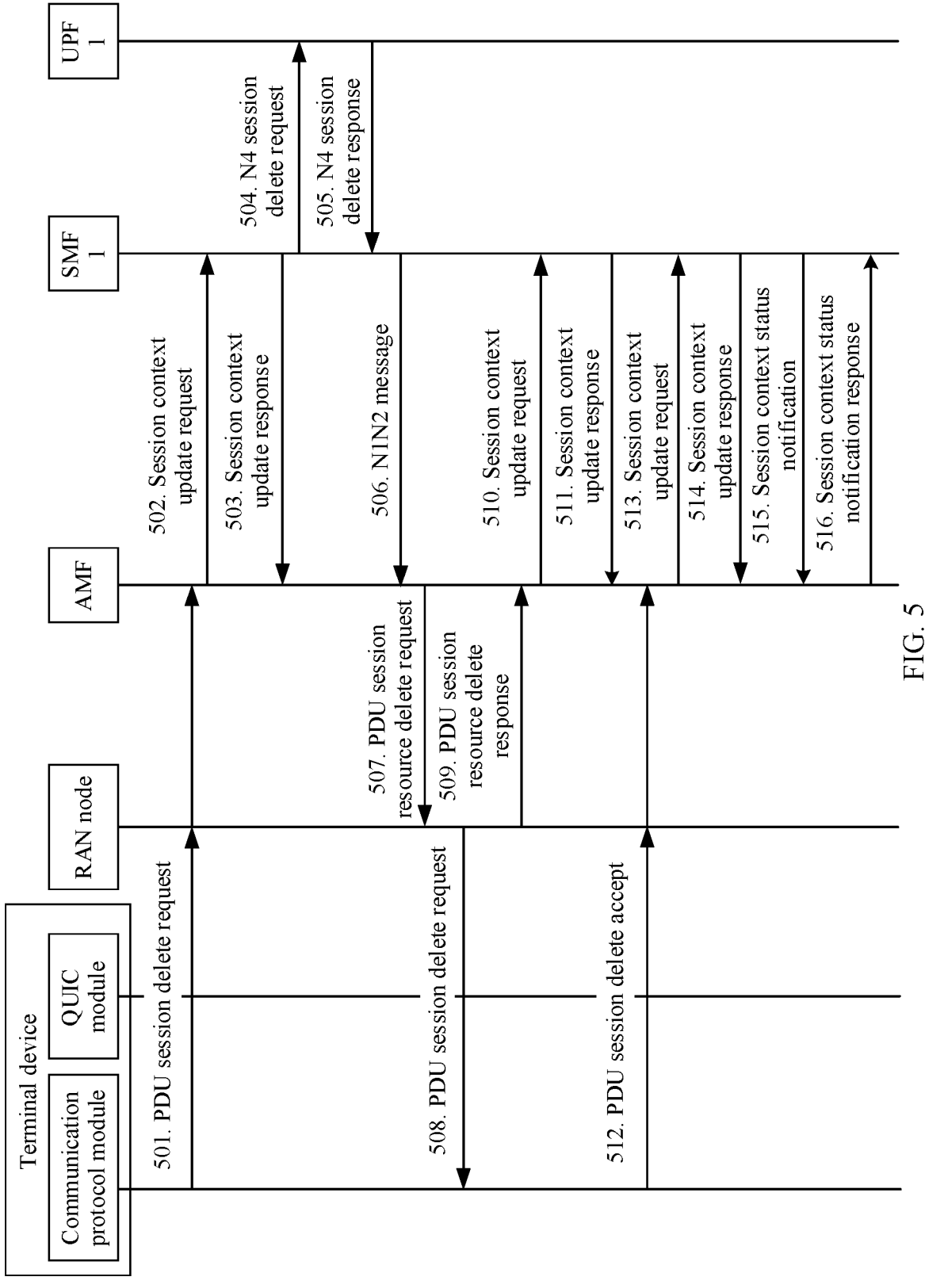
FIG. 5 is a schematic flowchart of another communication method according to an embodiment.

For example, the PDU session identified by the PDU session identifier 1 is released. FIG. 5 is a schematic flowchart of a PDU session release method according to an embodiment. The method includes the following steps.

501. A communication protocol module of a terminal device sends a request 16 to an AMF. The request 16 requests to delete the PDU session identified by the PDU session identifier 1. For example, the request 16 may also be referred to as a PDU session deletion request, a request for deleting a PDU session, or the like. For example, the request 16 may include the PDU session identifier 1.

In some embodiments, the communication protocol module may send the request 16 to the AMF by using a RAN node. For example, the communication protocol module sends the request 16 to the RAN node, and the RAN node forwards the request 16 to the AMF.

502. After receiving the request 16, the AMF sends a request 17 to an SMF 1. The request 17 is used to forward the request 16. The request 17 may also be referred to as a session context update request message, a request for updating a session context, a session context update request, or the like.

503. The SMF 1 receives the request 17, and sends a response 17 to the AMF. The response 17 is a response to the request 17, and may also be referred to as a session context update response message, a response for updating a session context, a session context update response, or the like.

504. The SMF 1 sends a request 18 to the UPF 1, where the request 18 requests to delete an N4 session between the SMF 1 and a UPF 1 for the PDU session identified by the PDU session identifier 1. For example, the request 18 may also be referred to as an N4 session deletion request message, an N4 session deletion request, a request for deleting an N4 session, or the like.

505. The UPF 1 receives the request 18, deletes the N4 session between the SMF 1 and the UPF 1 for the PDU session identified by the PDU session identifier 1, and sends a response 18 to the SMF 1. The response 18 is a response to the request 18, and may also be referred to as an N4 session deletion response message, an N4 session deletion response, a response for deleting an N4 session, or the like.

506. After receiving the response 18, the SMF 1 sends an N1N2 message to the AMF. The N1N2 message includes a request 19 and a request 20. The request 19 requests to delete a PDU session resource, and is sent by the SMF 1 to the RAN node. The request 19 may also be referred to as a PDU session resource deletion request, a request for deleting a PDU session resource, or the like. The request 20 requests to delete a PDU session, and is sent by the SMF 1 to the communication protocol module of the terminal device. The request 20 may also be referred to as a PDU session deletion request.

507. The AMF receives the N1N2 message, and sends the request 19 and the request 20 to the RAN node.

508. The RAN node receives the request 19 and the request 20, and forwards the request 20 to the communication protocol module of the terminal device.

509. The RAN node sends a response 19 to the AMF. The response 19 is a response to the request 19, and indicates PDU session deletion. The response 19 may also be referred to as a PDU session deletion response, a response for deleting a PDU session, or the like.

510. The AMF receives the response 19, and sends a request 21 to the SMF 1, where the request 21 is used to forward the response 19. For example, the request 21 includes the response 19. The request 21 may also be referred to as a request for updating a session context, a session context update request, or the like.

511. The SMF 1 receives the request 21, and sends a response 21 to the AMF. The response 21 is a response to the request 21, and may also be referred to as a response for updating a session context, a session context update response, or the like.

512. The communication protocol module of the terminal device receives the request 20, and sends a response 20 to the AMF, where the response 20 is a response to the request 20, and may also be referred to as a PDU session deletion accept message, a message for accepting deletion of a PDU session, or the like.

For example, the communication protocol module of the terminal device forwards the response 20 to the AMF by using the RAN node.

513. The AMF receives the response 20, and sends a request 22 to the SMF 1. The request 22 is used to forward the response 20. For example, the request 22 includes the response 20. The request 22 may also be referred to as a request for updating a session context, a session context update request, or the like.

514. The SMF 1 receives the request 22, and sends a response 22 to the AMF, where the response 22 is a response to the request 22, and may also be referred to as a response for updating a session context, a session context update response, or the like.

515. The SMF 1 sends a session context status notification to the AMF. The session context status notification indicates the AMF to delete the PDU session identified by the PDU session identifier 1.

516. The AMF receives the session context status notification, and sends a session context status notification response to the SMF 1. In this way, the PDU session identified by the PDU session identifier 1 is released.

Figure 6A:
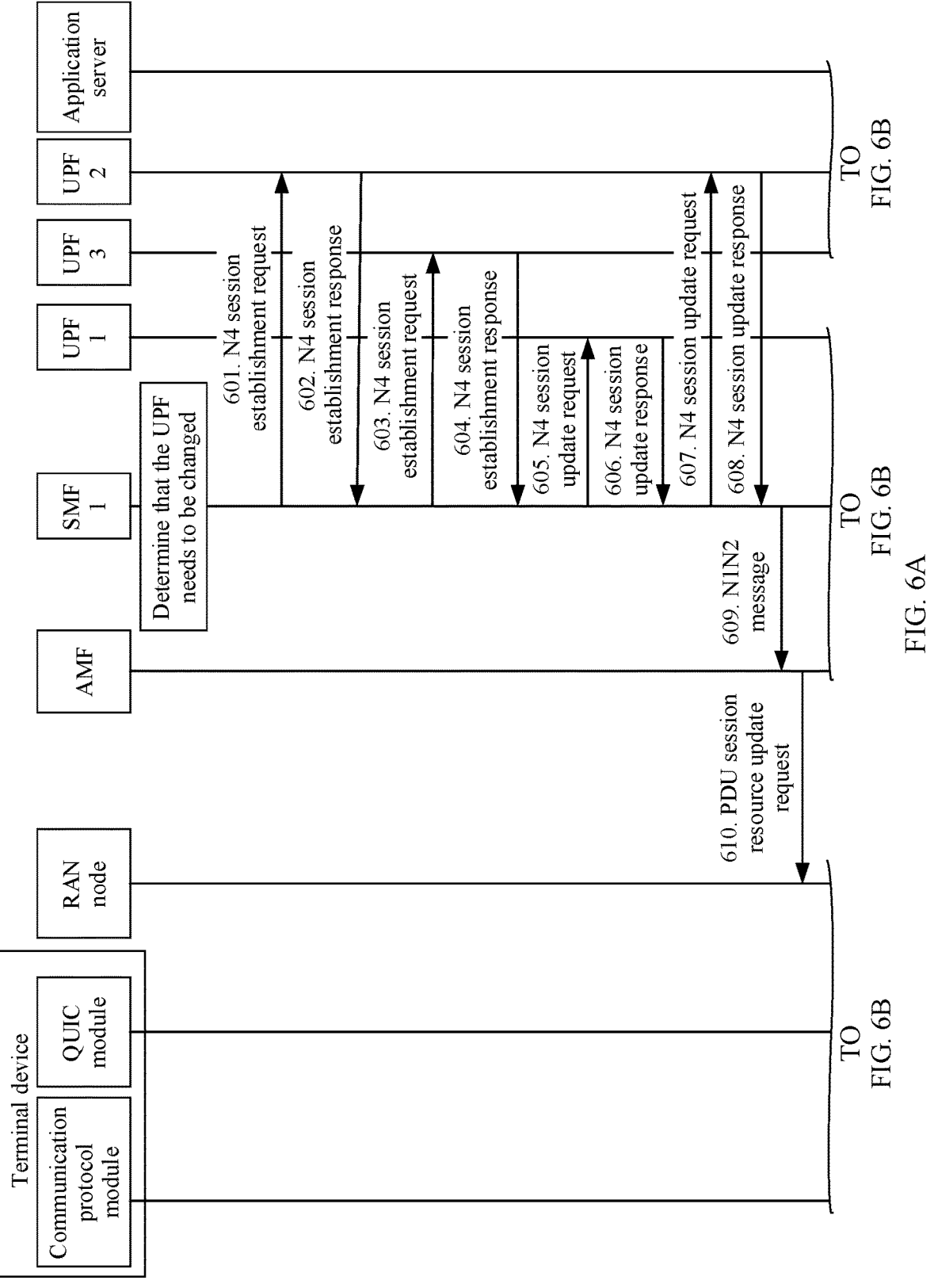
FIG. 6A and FIG. 6B are a schematic flowchart of another communication method according to an embodiment.
Figure 6B:
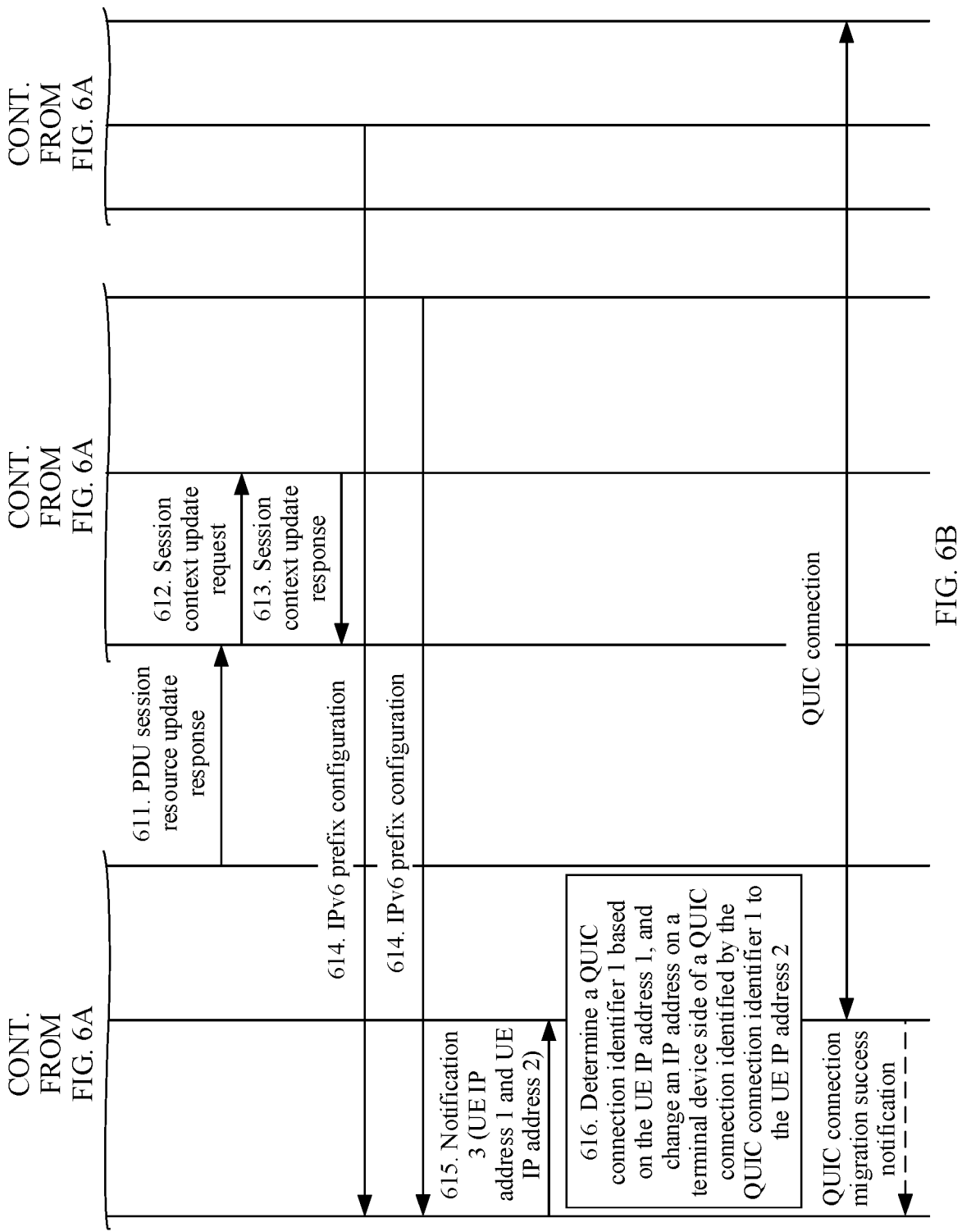

Example 4: Based on Example 1, when determining to trigger the change of the UPF for providing a service for the terminal device, the SMF 1 triggers a PDU session migration procedure. For example, when the UPF 1 is not an optimal UPF for providing a service for the terminal device, the SMF 1 determines to trigger the change of the UPF for providing a service for the terminal device. For another example, when the UPF 1 is faulty, the SMF 1 determines to trigger the change of the UPF for providing a service for the terminal device. For example, when the terminal device includes a QUIC module, the PDU session migration procedure may be as shown in FIG. 6A and FIG. 6B, and includes the following steps.

601. The SMF 1 detects an event that triggers the change of the UPF for providing a service for the terminal device, selects a UPF 2 to provide a service for the terminal device, and then sends a request 23 to the UPF 2. The request 23 requests to establish an N4 session. The request 23 may also be referred to as an N4 session establishment request, a request for establishing an N4 session, or the like.

602. The UPF 2 receives the request 23, and sends a response 23 to the SMF 1. The response 23 is a response to the request 23, and may also be referred to as an N4 session establishment response, a response for establishing an N4 session, or the like.

603. The SMF 1 receives the response 23, and selects a UPF 3 to classify service data packets of the UPF 1 and the UPF 2. Then, the SMF 1 sends a request 24 to the UPF 3. The request 24 requests to establish an N4 session. The request 24 may also be referred to as an N4 session establishment request, a request for establishing an N4 session, or the like.

It should be noted that the UPF 3 may also be referred to as a classifier UPF.

604. The UPF 3 receives the request 24, and sends a response 24 to the SMF 1. The response 24 is a response to the request 24, and may include N9 interface service data packet forwarding information and N3 interface service data packet forwarding information that are allocated by the UPF 3. The service data packet forwarding information may include, for example, a tunnel endpoint identifier and/or an IP address. The response 24 may also be referred to as an N4 session establishment response, a response for establishing an N4 session, or the like.

605. The SMF 1 receives the response 24, and sends a request 25 to the UPF 1. For example, the request 25 includes the N9 interface service data packet forwarding information of the UPF 3. The request 25 may also be referred to as an N4 session update request, an N4 session update request message, a request for updating an N4 session, or the like. This is not limited herein.

606. The UPF 1 receives the request 25, and sends a response 25 to the SMF 1. The response 25 is a response to the request 25, and may also be referred to as an N4 session update response, an N4 session update response message, a response for updating an N4 session, or the like. This is not limited herein.

607. The SMF 1 receives the response 25, and further sends a request 26 to the UPF 2 after receiving the response 24. The request 26 includes the N9 interface service data packet forwarding information allocated by the UPF 3. The request 26 may also be referred to as an N4 session update request, an N4 session update request message, a request for updating an N4 session, or the like. This is not limited herein.

608. The UPF 2 receives the request 26, and sends a response 26 to the SMF 1. The response 26 is a response to the request 26, and may also be referred to as an N4 session update response, an N4 session update response message, a response for updating an N4 session, or the like. This is not limited herein.

609. The SMF 1 receives the response 26, and sends an N1N2 message to an AMF. The N1N2 message includes information such as a request 27. The request 27 requests to update a PDU session resource, and is sent by the SMF 1 to a RAN node. For example, the request 27 includes the N3 interface service data packet forwarding information allocated by the UPF 3. For example, the request 27 may also be referred to as a PDU session resource update request, a request for updating a PDU session resource, or the like.

610. The AMF receives the N1N2 message, and forwards the request 27 to the RAN node.

611. The RAN node receives the request 27, and sends a response 27 to the AMF. The response 27 is a response to the request 27, and may also be referred to as a PDU session resource update response, a response for updating a PDU session resource, or the like.

612. The AMF receives the response 27, and sends a request 28 to the SMF 1. The request 28 is used to forward the response 27, and may also be referred to as a session context update request message, a session context update request, a request for updating a session context, or the like. This is not limited herein.

613. The SMF 1 receives the request 28, and sends a response 28 to the AMF. The response 28 is a response to the request 28, and may also be referred to as a session context update response message, a session context update response, a response for updating a session context, or the like. This is not limited herein.

614. The UPF 1 and the UPF 2 send an IPv6 route advertisement message to a communication protocol module of the terminal device. The UPF 1 modifies validity time of an IPv6 prefix (UE IP address 1) allocated to the terminal device to 0, and the UPF 2 includes the allocated new IPv6 prefix (UE IP address 2) in the IPv6 route advertisement message, and sends the IPv6 route advertisement message to the terminal device. As indicated by the SMF 1, the UPF 1 and the UPF 2 send the IPv6 route advertisement message. For example, after sending the response 28 to the AMF, the SMF 1 indicates the UPF 1 and the UPF 2 to send the IPv6 route advertisement message to the communication protocol module of the terminal device.

615. The communication protocol module of the terminal device receives the IPv6 route advertisement message, and sends a notification 3 to the QUIC module, where the notification 3 includes the UE IP address 1 and the UE IP address 2. The IPv6 route advertisement message indicates that a PDU session is successfully established.

616. After receiving the notification 3, the QUIC module of the terminal device determines a QUIC connection identifier 1 based on the UE IP address 1. The UE IP address 1 is an IP address on a terminal device side of a QUIC connection identified by the QUIC connection identifier 1. Subsequently, the QUIC module changes the IP address on the terminal device side of the QUIC connection identified by the QUIC connection identifier 1 to the UE IP address 2. In this way, the terminal device communicates with an application server by using the changed IP address on the terminal device side of the QUIC connection, and does not need to disconnect the QUCI connection nor establish a new connection to communicate with the application server, thereby implementing PDU session migration.

For related implementation of step 615 and step 616 and replacement steps, refer to the method shown in FIG. 4A and FIG. 4B. Details are not described herein again.

Figure 7:
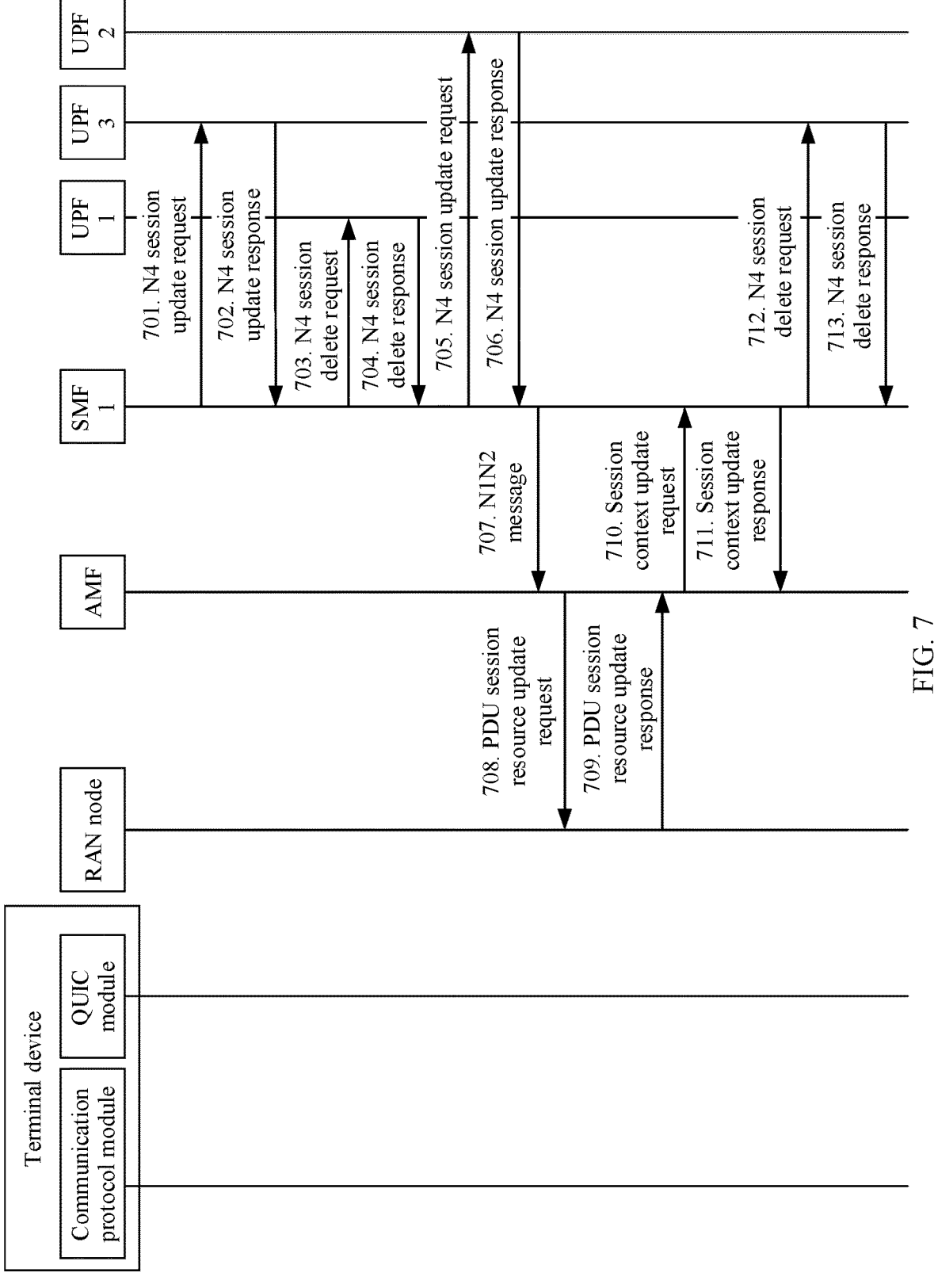
FIG. 7 is a schematic flowchart of another communication method according to an embodiment.

Example 5: In this embodiment, alternatively, the SMF 1 may trigger the PDU session release procedure. For example, in the method shown in FIG. 6A and FIG. 6B, the SMF 1 may start a timer when determining to trigger the change of the UPF for providing a service for the terminal device, or after sending the request 24 to the UPF 3, or when receiving the response 24, and trigger the PDU session release procedure when the timer expires. For example, with reference to the method shown in FIG. 6A and FIG. 6B, when the PDU session release procedure is triggered by the SMF, the PDU session release procedure may be as shown in FIG. 7, and includes the following steps.

701. An SMF 1 sends a request 29 to a UPF 3 when a timer expires. The request 29 requests to delete a service data packet forwarding channel of a UPF 1. For example, the request 29 may also be referred to as an N4 session update request, a request for updating an N4 session, or the like.

702. The UPF 3 receives the request 29, and sends a response 29 to the SMF 1. The response 29 is a response to the request 29, and may also be referred to as an N4 session update response, a response for updating an N4 session, or the like.

703. The SMF 1 receives the response 29, and sends a request 30 to the UPF 1. The request 30 requests to delete an N4 session between the SMF 1 and the UPF 1, and may also be referred to as an N4 session deletion request, a request for deleting an N4 session, or the like.

704. The UPF 1 receives the request 30, and sends a response 30 to the SMF 1. The response 30 is a response to the request 30, and may also be referred to as an N4 session deletion response, a response for deleting an N4 session, or the like.

705. The SMF 1 receives the response 30, and sends a request 31 to a UPF 2. The request 31 requests to delete a service data packet forwarding channel to the UPF 3. The request 31 may also be referred to as an N4 session update request, a request for updating an N4 session, or the like.

706. The UPF 2 receives the request 31, and sends a response 31 to the SMF 1. The response 31 is a response to the request 31, and may also be referred to as an N4 session update response, a response for updating an N4 session, or the like.

707. The SMF 1 receives the response 31, and sends an N1N2 message to an AMF. The N1N2 message includes service data packet forwarding information allocated by the UPF 2.

708. The AMF receives the N1N2 message, and sends a request 32 to a RAN node. The request 32 is used to update a PDU session resource, and may include the service data packet forwarding information allocated by the UPF 2. The request 32 may also be referred to as a PDU session resource update request, a request for updating a PDU session resource, or the like.

709. The RAN node receives the request 32, and sends a response 32 to the AMF. The response 32 is a response to the request 32, and may also be referred to as a PDU session resource update response, a response for updating a PDU session resource, or the like.

710. The AMF receives the response 32, and sends a request 33 to the SMF 1. The request 33 is used to forward the response 32. For example, the request 33 includes the response 32. The request 33 may also be referred to as a session context update request, a request for updating a session context, or the like.

711. The SMF 1 receives the request 33, and sends a response 33 to the AMF. The response 33 is a response to the request 33. For example, the response 33 may also be referred to as a session context update response, a response for updating a session context, or the like.

712. The SMF 1 sends a request 34 to the UPF 3. The request 34 requests to delete an N4 session, and may also be referred to as an N4 session deletion request, a request for deleting an N4 session, or the like.

713. The UPF 3 receives the request 34, and sends a response 34 to the SMF 1. The response 34 is a response to the request 34, and may also be referred to as an N4 session deletion response, a response for deleting an N4 session, or the like.

The foregoing embodiments may be used in combination with each other, or may be used separately. This is not limited herein.

With reference to the foregoing embodiments, a further embodiment of this disclosure provides a communication method. As shown in FIG. 8, the communication method includes the following steps.

801. A terminal device sends a first request to a mobility management network element, where the first request requests to establish a first PDU session for a first data network.

802. The terminal device receives a first response from a first session management network element, where the first response indicates that the first PDU session is successfully established, and the first response includes a first IP address of the terminal device.

803. The terminal device sends a second request to an application server of the first data network, where the second request requests to establish a first QUIC connection, the second request includes a first connection identifier, the first connection identifier identifies the first QUIC connection, and an IP address on a terminal device side of the first QUIC connection is the first IP address.

804. The terminal device receives a second response sent by the application server, where the second response indicates that the first QUIC connection is successfully established, and the second response includes the first connection identifier.

In some embodiments, the terminal device further sends a third request to the mobility management network element, the third request requests to establish a second PDU session for the first data network, the terminal device receives a third response from the second session management network element, the third response indicates that the second PDU session is successfully established, and the third response includes a second IP address of the terminal device. Then, the terminal device changes the IP address on the terminal device side of the first QUIC connection to the second IP address.

In some embodiments, a first session identifier is associated with the first connection identifier, and the first session identifier identifies the first PDU session. The terminal device determines the first connection identifier based on the first session identifier, changes the IP address on the terminal device side of the first QUIC connection to the second IP address, and then changes the first session identifier associated with the first connection identifier to a second session identifier, where the second session identifier identifies the second PDU session.

In some other embodiments, the first IP address or the first session identifier is associated with a first mapping identifier, the first session identifier identifies the first PDU session, and the first mapping identifier identifies the first QUIC connection, where the first session identifier is different from the first mapping identifier.

In some other embodiments, the terminal device sends a third request to the mobility management network element, and the third request requests to establish a second PDU session for the first data network. The terminal device receives a third response from a second session management network element, where the third response indicates that the second PDU session is successfully established, and the third response includes a second IP address of the terminal device. Then, the terminal device determines the first mapping identifier based on the first IP address or the first session identifier, changes the IP address on the terminal device side of the first QUIC connection identified by the first mapping identifier to the second IP address, and changes the first IP address associated with the first mapping identifier to the second IP address or changes the first session identifier associated with the first mapping identifier to a second session identifier, where the second session identifier identifies the second PDU session.

In some other embodiments, the terminal device deletes the first PDU session after changing the IP address on the terminal device side of the first QUIC connection identified by the first mapping identifier to the second IP address.

For example, an embodiment further provides a communication apparatus. A structure of the communication apparatus may be as shown in FIG. 2 and includes a communication protocol module and a QUIC module. The communication apparatus may be a chip in a terminal device, or may be a terminal device. This is not limited.

For the communication protocol module and the QUIC module, refer to related descriptions of the method parts. Details are not described herein again.

For another example, FIG. 9 shows another communication apparatus 900 according to an embodiment. The communication apparatus 900 includes at least one processor 910, and may be configured to implement functions of the terminal device in the methods shown in FIG. 3A to FIG. 7.

In an example, the communication apparatus 900 may further include a memory 920. The memory 920 stores a computer program. The memory 920 is coupled to a processor 910. Couplings in this embodiment are indirect couplings or communication connections between apparatuses, units, or modules, may be implemented in an electrical form, a mechanical form, or another form, and are used for information exchange between the apparatuses, the units, or the modules. In another implementation, the memory 920 may alternatively be located outside the communication apparatus 900. The processor 910 may cooperate with the memory 920. The processor 910 may invoke a computer program stored in the memory 920, to implement the communication methods provided in the foregoing embodiments. At least one of the at least one memory may be included in the processor.

In some embodiments, the communication apparatus 900 may further include a communication interface 930, configured to communicate with another device by using a transmission medium, so that an apparatus used in the communication apparatus 900 can communicate with the another device. For example, the communication interface 930 may be a transceiver, a circuit, a bus, a module, or another type of communication interface. The another device may be another terminal. The processor 910 receives and sends information through the communication interface 930, and is configured to implement the methods in the foregoing embodiments.

In embodiments, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments. The general-purpose processor may be a microprocessor or any conventional processor or the like. The steps of the methods disclosed with reference to embodiments may be directly performed by a hardware processor, or may be performed by using a combination of hardware in the processor and a software module.

In embodiments, the memory may be a nonvolatile memory, for example, a hard disk drive (HDD) or a solid-state drive (SSD), or may be a volatile memory such as a random access memory (RAM). The memory is any other medium that can carry or store expected program code in a form of instructions or a data structure and that can be accessed by a computer, but is not limited thereto. The memory may alternatively be a circuit or any other apparatus that can implement a storage function, and is configured to store the computer program, and/or the data.

All or some of the methods in embodiments herein may be implemented by using software, hardware, firmware, or any combination thereof. When software is used for implementation, the embodiments may be implemented completely or partially in a form of a computer program product. The computer program product includes one or more computer instructions. When the computer program is loaded and executed on the computer, the procedures or functions according to the embodiments are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clearly that, a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A communication apparatus, comprising:

processor-readable memory; and processing circuitry, the processing circuitry providing:

a communication protocol module configured to:

send a first request to a mobility management network element, wherein the first request is a request to establish a first protocol data unit (PDU) session for a first data network;

receive a first response from a first session management network element, and send a first notification to a Quick User Datagram Protocol Internet Connections (QUIC) module after receiving the first response, wherein the first response indicates that the first PDU session is successfully established and comprises a first IP address of the communication apparatus, and wherein the first notification comprises the first IP address; and the QUIC module, which is configured to:

receive the first notification from the communication protocol module, send a second request to an application server of the first data network after receiving the first notification, wherein the second request is a request to establish a first QUIC connection, wherein the second request comprises a first connection identifier that identifies the first QUIC connection, wherein the first connection identifier is allocated by the QUIC module to the first QUIC connection, and wherein the first IP address is an IP address on a communication apparatus side of the first QUIC connection; and receive a second response from the application server, wherein the second response indicates that the first QUIC connection is successfully established, and wherein the second response comprises the first connection identifier.

2. The communication apparatus according to claim 1, wherein the communication protocol module is further configured to send a third request to the mobility management network element, the third request being a request to establish a second PDU session for the first data network, wherein the communication protocol module is further configured to:

receive a third response from a second session management network element, wherein the third response indicates that the second PDU session is successfully established, and wherein the third response comprises a second IP address of the communication apparatus, and send a second notification to the QUIC module after receiving the third response, wherein the second notification comprises the first IP address and the second IP address, and wherein the QUIC module is further configured to:

receive the second notification from the communication protocol module, determine the first connection identifier based on the first IP address after receiving the second notification, and change, to the second IP address, the IP address on the communication apparatus side of the first QUIC connection identified by the first connection identifier.

3. The communication apparatus according to claim 1, wherein the first notification further comprises a first session identifier that identifies the first PDU session and is allocated by the communication protocol module to the first PDU session; and wherein the QUIC module is further configured to associate the first session identifier with the first connection identifier after receiving the second response.

4. The communication apparatus according to claim 3, wherein the communication protocol module is further configured to send a third request to the mobility management network element, wherein the third request is a request to establish a second PDU session for the first data network;

wherein the communication protocol module is further configured to:

receive a third response from a second session management network element, wherein the third response indicates that the second PDU session is successfully established, and wherein the third response comprises a second IP address of the communication apparatus, and send a second notification to the QUIC module after receiving the third response, wherein the second notification comprises the first session identifier, the second IP address, and a second session that identifies the second PDU session and is allocated by the communication protocol module to the second PDU session; and wherein the QUIC module is further configured to:

receive the second notification from the communication protocol module, determine the first connection identifier based on the first session identifier after receiving the second notification, change the IP address on the communication apparatus side of the first QUIC connection identified by the first connection identifier to the second IP address, and change the first session identifier associated with the first connection identifier to the second session identifier.

5. The communication apparatus according to claim 2, wherein the QUIC module is further configured to send a third notification to the communication protocol module after changing the IP address on the communication apparatus side of the first QUIC connection to the second IP address, wherein the third notification indicates that the QUIC connection is successfully migrated; and wherein the communication protocol module is further configured to delete the first PDU session after receiving the third notification.

6. The communication apparatus according to claim 1, wherein the QUIC module is further configured to send a fourth notification to the communication protocol module, wherein the fourth notification comprises a first mapping identifier that identifies the first QUIC connection and is allocated by the QUIC module; and wherein the communication protocol module is further configured to receive the fourth notification from the QUIC module and associate, after receiving the fourth notification, the first mapping identifier with the first IP address or a first session identifier, wherein the first session identifier identifies the first PDU session and is allocated by the communication protocol module to the first PDU session.

7. The communication apparatus according to claim 6, wherein the communication protocol module is further configured to:

send a third request to the mobility management network element, wherein the third request is a request to establish a second PDU session for the first data network;

receive a third response from a second session management network element, wherein the third response indicates that the second PDU session is successfully established and comprises an second IP address of the communication apparatus, determine, after receiving the third response, the first mapping identifier based on the first IP address or the first session identifier, and send a second notification to the QUIC module, the second notification comprising the first mapping identifier and the second IP address;

wherein the QUIC module is further configured to:

receive the second notification from the communication protocol module, change the IP address on the communication apparatus side of the first QUIC connection identified by the first mapping identifier to the second IP address after receiving the second notification, and send a third notification to the communication protocol module, wherein the third notification indicates that the QUIC connection is successfully migrated; and wherein the communication protocol module is further configured to:

after receiving the third notification, change the first IP address associated with the first mapping identifier to the second IP address; or after receiving the third notification, change the first session identifier associated with the first mapping identifier to a second session identifier, wherein the second session identifier identifies the second PDU session and is allocated by the communication protocol module to the second PDU session.

8. The communication apparatus according to claim 7, wherein the communication protocol module is further configured to delete the first PDU session after receiving the third notification.

9. The communication apparatus according to claim 6, wherein the first mapping identifier is associated with the first connection identifier.

10. A communication method, comprising:

sending, by a terminal device, a first request to a mobility management network element, wherein the first request is a request to establish a first protocol data unit (PDU) session for a first data network;

receiving, by the terminal device, a first response from a first session management network element, wherein the first response indicates that the first PDU session is successfully established and comprises a first IP address of the terminal device;

sending, by the terminal device, a second request to an application server of the first data network, wherein the second request is a request to establish a first Quick User Datagram Protocol Internet Connections (QUIC) connection and comprises a first connection identifier that identifies the first QUIC connection, and wherein the first IP address is an IP address on a terminal device side of the first QUIC connection; and receiving, by the terminal device, a second response sent by the application server, wherein the second response indicates that the first QUIC connection is successfully established and comprises the first connection identifier.

11. The method according to claim 10, wherein the method further comprises:

sending, by the terminal device, a third request to the mobility management network element, wherein the third request is a request to establish a second PDU session for the first data network;

receiving, by the terminal device, a third response from a second session management network element, wherein the third response indicates that the second PDU session is successfully established and comprises a second IP address of the terminal device; and changing, by the terminal device, the IP address on the terminal device side of the first QUIC connection to the second IP address.

12. The method according to claim 11, wherein a first session identifier is associated with the first connection identifier, wherein the first session identifier identifies the first PDU session, wherein before the changing, by the terminal device, the IP address on the terminal device side of the first QUIC connection to the second IP address, the method further comprises determining, by the terminal device, the first connection identifier based on the first session identifier; and wherein after the changing, by the terminal device, the IP address on the terminal device side of the first QUIC connection to the second IP address, the method further comprises changing, by the terminal device, the first session identifier associated with the first connection identifier to a second session identifier that identifies the second PDU session.

13. The method according to claim 10, wherein the first IP address or a first session identifier is associated with a first mapping identifier, the first session identifier identifies the first PDU session, and the first mapping identifier identifies the first QUIC connection.

14. The method according to claim 13, wherein the method further comprises:

sending, by the terminal device, a third request to the mobility management network element, wherein the third request is a request to establish a second PDU session for the first data network;

receiving, by the terminal device, a third response from a second session management network element, wherein the third response indicates that the second PDU session is successfully established and comprises a second IP address of the terminal device;

determining, by the terminal device, the first mapping identifier based on the first IP address or the first session identifier;

changing the IP address on the terminal device side of the first QUIC connection identified by the first mapping identifier to the second IP address; and changing the first IP address associated with the first mapping identifier to the second IP address or changing the first session identifier associated with the first mapping identifier to a second session identifier that identifies the second PDU session.

15. The method according to claim 11, wherein after the changing, by the terminal device, the IP address on the terminal device side of the first QUIC connection identified by the first connection identifier to the second IP address, the method further comprises:

deleting, by the terminal device, the first PDU session.

16. A non-transitory computer-readable storage medium having stored thereon processor executable instructions that, when executed by a processor, cause the processor to carry out the method according to claim 10.

17. The communication apparatus according to claim 1, wherein the QUIC module is further configured to:

allocate a first mapping identifier that identifies a first QUIC connection, and send a notification comprising the first mapping identifier to the communication protocol module; and wherein the communication protocol module is further configured to:

receive the notification comprising the first mapping identifier from the QUIC module, and associate the first mapping identifier with at least one of:

a first IP address of the communication apparatus, or a first session identifier that identifies a first PDU session.

18. The communication apparatus according to claim 17, wherein the QUIC module is further configured to, after receiving a notification from the communication protocol module indicating establishment of a second PDU session and comprising a second IP address, change the IP address on the terminal device side of a first QUIC connection from a first IP address to the second IP address.

19. The communication apparatus according to claim 18, wherein the QUIC module is further configured to determine the first QUIC connection based on a connection identifier associated with the first IP address, and to rebind the first QUIC connection to the second IP address without disconnecting the QUIC connection.

20. The communication apparatus according to claim 19, wherein, after changing the IP address on the terminal device side of the first QUIC connection to the second IP address, the QUIC module is further configured to send a notification to the communication protocol module indicating that the QUIC connection has been successfully migrated.

* * * * *